(12) United States Patent
Takahashi et al.

(10) Patent No.: US 10,732,076 B2
(45) Date of Patent: Aug. 4, 2020

(54) VEHICLE RESTRAINT DEVICE

(71) Applicant: MEIDENSHA CORPORATION, Tokyo (JP)

(72) Inventors: Toshimichi Takahashi, Ota (JP); Masao Furusawa, Kyoto (JP)

(73) Assignee: MEIDENSHA CORPORATION, Tokyo (JP)

( * ) Notice: Subject to any disclaimer, the term of this patent is extended or adjusted under 35 U.S.C. 154(b) by 160 days.

(21) Appl. No.: 15/574,044

(22) PCT Filed: Apr. 22, 2016

(86) PCT No.: PCT/JP2016/062728
§ 371 (c)(1),
(2) Date: Nov. 14, 2017

(87) PCT Pub. No.: WO2016/185869
PCT Pub. Date: Nov. 24, 2016

(65) Prior Publication Data
US 2018/0299350 A1 Oct. 18, 2018

(30) Foreign Application Priority Data
May 15, 2015 (JP) .................................. 2015-100385

(51) Int. Cl.
*G01M 17/007* (2006.01)
(52) U.S. Cl.
CPC .............................. *G01M 17/0074* (2013.01)

(58) Field of Classification Search
CPC . G01M 17/0074; G01M 17/007; G01D 11/16
See application file for complete search history.

(56) References Cited

U.S. PATENT DOCUMENTS

| | | | | |
|---|---|---|---|---|
| 4,455,866 A | * | 6/1984 | Barrigar | ............ G01M 17/0074 73/116.07 |
| 4,593,557 A | * | 6/1986 | Oblizajek | ........... G01M 17/022 73/146 |
| 4,862,737 A | * | 9/1989 | Langer | ................ G01M 17/007 73/116.07 |

(Continued)

FOREIGN PATENT DOCUMENTS

| | | |
|---|---|---|
| JP | 63-174047 U | 11/1988 |
| JP | S64-83743 A | 3/1989 |

(Continued)

*Primary Examiner* — Freddie Kirkland, III
(74) *Attorney, Agent, or Firm* — Foley & Lardner LLP

(57) ABSTRACT

In a type of vehicle restraint device where a vehicle is restrained on rollers of a vehicle testing device by using wire ropes, etc., it was necessary to provide the vehicle with hook portions for engaging the wire ropes, etc. and difficult to reproduce the vehicle pitching movement behavior due to pressing the vehicle against the rollers by the wire ropes, etc. Thus, vehicle restraint device 11 that restrains vehicle 1 placed on rollers 7 of a vehicle testing device is equipped with a pair of vehicle restraint jigs 12 each having one end side rotatably coupled to vehicle 1 and the other end side rotatably coupled to left or right pole 10 on floor surface 9, and second link mechanism 501 that couples the other end side of this vehicle restraint jig 12 to pole 10 to allow a yawing movement of vehicle restraint jig 12.

22 Claims, 33 Drawing Sheets

(56) References Cited

U.S. PATENT DOCUMENTS

| | | | | |
|---|---|---|---|---|
| 5,111,685 A * | 5/1992 | Langer | | G01M 17/0074 73/118.01 |
| 6,446,501 B1 * | 9/2002 | Domeck | | G01M 17/007 73/146 |
| 7,926,337 B2 * | 4/2011 | Inoue | | G01M 17/0074 73/116.01 |
| 8,186,207 B2 * | 5/2012 | Litz | | G01M 17/0074 73/116.07 |
| 8,607,626 B2 * | 12/2013 | Litz | | G01M 17/007 73/116.07 |
| 8,788,116 B2 * | 7/2014 | Litz | | G05D 1/0238 701/2 |
| 9,442,053 B2 * | 9/2016 | Melz | | G01N 3/38 |
| 10,241,008 B2 * | 3/2019 | Kaneko | | G01M 17/0074 |
| 2009/0133484 A1 * | 5/2009 | Inoue | | G01M 17/0074 73/117.01 |
| 2009/0217775 A1 * | 9/2009 | Litz | | G01M 9/062 73/862.391 |
| 2012/0128413 A1 | 5/2012 | Suwazono | | |
| 2016/0313213 A1 * | 10/2016 | Takahashi | | G01M 17/0074 |
| 2016/0313214 A1 * | 10/2016 | Takahashi | | G01M 17/0074 |

FOREIGN PATENT DOCUMENTS

| | | |
|---|---|---|
| JP | 01-167642 U | 11/1989 |
| JP | H12-79131 A | 11/1989 |
| JP | H21-18849 U | 9/1990 |
| JP | H42-8045 Y2 | 7/1992 |
| JP | 09-304237 A | 11/1997 |
| JP | H10-67376 A | 3/1998 |
| JP | 10-307082 A | 11/1998 |
| JP | 2001-080583 A | 3/2001 |
| JP | 2002-131189 A | 5/2002 |
| JP | 2007-132766 A | 5/2007 |
| JP | 2007-212154 A | 8/2007 |
| JP | 2011-033517 A | 2/2011 |

* cited by examiner (A)

(B)

(A)

(B)

(A)

(B)

(A)

(B)

(A)

(B)

VEHICLE RESTRAINT DEVICE

TECHNICAL FIELD

The present invention relates to a vehicle restraint device for restraining a vehicle in a vehicle testing device, such as chassis dynamometer, that conducts tests of fuel consumption, exhaust gases, etc. while placing the vehicle on rollers.

BACKGROUND ART

As a vehicle restraint device, as shown in FIG. 39, there is one type (for example, Patent Publications 1 and 2) in which tires 102a of a vehicle 102 are restrained on rollers 106 of a chassis dynamometer 105 by using chains or wire ropes 101, connecting one end side 101a of the wire rope 101 to the vehicle 102, and connecting the other end portion 101b to a pole 104 installed on a floor surface 103.

Furthermore, as shown in FIGS. 40(A) and (B), there has been developed one type (for example, Patent Publication 3) in which a vehicle restraint device 112 is attached to be slidable along a rail 111, an arm portion 114 provided at an arm supporting portion 113 of this vehicle restraint device 112 is formed at its end portion with a vehicle coupling adaptor 115, and this adaptor 115 is inserted into an adaptor inserting portion 118 provided at a chassis 117 of a vehicle 116 to restrain the vehicle.

PRIOR ART PUBLICATIONS

Patent Publications

Patent Publication 1: JP Patent Application Publication Heisei 10-307082 A.
Patent Publication 2: JP Patent Application Publication 2007-212154 A.
Patent Publication 3: JP Patent Application Publication 2011-033517 A (see paragraph [0002] to paragraph [0005], and FIG. 6 and FIG. 7).
Patent Publication 4: JP Patent Application Publication Heisei 1-279131 A.
Patent Publication 5: JP Patent Application Publication Heisei 10-67376 A.
Patent Publication 6: JP Patent Application Publication Showa 64-83743 A.
Patent Publication 7: JP Patent Application Publication 2001-80583 A.
Patent Publication 8: JP Utility Model Application Publication Heisei 2-118849 U.
Patent Publication 9: JP Utility Model Application Publication Heisei 1-167642 U.
Patent Publication 10: JP Utility Model Application Examined Publication Heisei 4-28045 Y2.

SUMMARY OF THE INVENTION

In a vehicle running on an actual road, vertical load added to each tire changes in accordance with acceleration and deceleration. In contrast, in the case of using a chassis dynamometer, vertical load is different from that of running on a road since each degree of freedom of the vehicle is restrained.

Between the case of an actual running on a road and the case of using a chassis dynamometer, the manner of vertical load application is different due to the difference of the vehicle pitching movement, thereby affecting test results. The difference of the vertical load change affects the vehicle performance test accuracy. Therefore, it is necessary to reproduce the vehicle pitching movement behavior.

In the case of using chains or wire ropes 101 shown in FIG. 39, these chains or wire ropes 101 press the tires 102a of the vehicle 102 against the rollers 106. Therefore, it was difficult to reproduce the vehicle pitching movement behavior.

In contrast with this, the vehicle restraint device of Patent Publication 3 is one in which the coupling adaptor 115 of the vehicle restraint device 112 attached to be slidable along the rail 111 is inserted into the adaptor inserting portion 118 provided at the chassis 117 of the vehicle 116 to restrain the vehicle. Thus, it has an advantage that reproducing the vehicle pitching movement behavior is easy, since pressing vehicle tires against rollers by chains or wire ropes 101 like Patent Publications 1 and 2 is not conducted. On the other hand, it had the following tasks.

(1) The adaptor inserting portion is provided in general at a side sill of the vehicle bottom portion, and therefore the application is difficult in a vehicle with no side sill. In a vehicle with no side sill, it is necessary to mount an attachment with an adaptor inserting portion on the bottom portion of the vehicle.
(2) The adaptor inserting portion is required to be high in rigidity from the viewpoint of safety, but the side sill is not necessarily a high rigidity portion when viewing the entirety of the vehicle.
(3) The side sill is not positioned at the vehicle's gravity center. Therefore, due to not restraining the vehicle's gravity center, it becomes different from the vehicle pitching movement behavior when running on a road.

The present invention was made to solve the above-mentioned tasks.

Thus, a vehicle restraint device of the present invention is a vehicle restraint device for restraining a vehicle placed on rollers of a vehicle testing device and comprises a pair of vehicle restraint jigs having one end sides that are rotatably connected to the vehicle and another end sides that are rotatably connected to left and right poles on a floor surface; and a connecting mechanism that connects the another end sides of the vehicle restraint jigs to the poles to allow a yawing movement of the vehicle restraint jigs.

In one mode of the vehicle restraint device, the one end sides of the vehicle restraint jigs are respectively connected to left and right seatbelt fixing pillars of the vehicle.

One mode of the connecting mechanism comprises a shaft portion that passes through a bracket portion provided at the pole and is supported by a pair of bracket portions provided at the another end side of the vehicle restraint jig; and a spherical slide bearing that is mounted on the shaft portion and is fitted into the bracket portion of the pole.

One mode of the connecting mechanism comprises a shaft portion that passes through a bracket portion provided at the another end side of the vehicle restraint jig and is supported by a pair of brackets provided at the pole; and a spherical slide bearing that is mounted on the shaft portion and is fitted into the bracket portion of the vehicle restraint jig.

One mode of the connecting mechanism comprises a shaft portion that passes through a bracket portion provided at the pole and is supported by a pair of bracket portions provided at the another end side of the vehicle restraint jig; and a bearing that is mounted on the shaft portion, is fitted into the bracket portion of the pole, and has an elastic member.

One mode of the connecting mechanism comprises a shaft portion that passes through a bracket portion provided at the another end side of the vehicle restraint jig and is supported by a pair of brackets provided at the pole; and a bearing that is mounted on the shaft portion, is fitted into the bracket portion of the vehicle restraint jig, and has an elastic member.

In one mode of the vehicle restraint device, an intermediate member is mounted at a position of the shaft portion between the bracket of the pole and the bracket portion of the vehicle restraint jig.

One mode of the vehicle restraint device of the present invention is a vehicle restraint device for restraining a vehicle that has rear seat doors and is placed on rollers of a vehicle testing device, and comprises a pair of vehicle restraint jigs having one end sides that are rotatably connected to the vehicle in a vicinity of a vehicle gravity center of the vehicle; a link mechanism to which another end sides of the vehicle restraint jigs are connected in a rear seat room of the vehicle; and a pair of vehicle exterior fixing devices that are installed on a floor surface in vicinities of left and right rear seat doors of the vehicle and support the link mechanism through openings of the rear seat doors, wherein the link mechanism comprises a pair of left and right attachment members that are opposingly arranged in the rear seat room of the vehicle and are supported by the vehicle exterior fixing devices; a first reinforcing jig that connects and reinforces the pair of attachment members; and a connecting jig that connects another ends of the vehicle restraint jigs to around both ends of the first reinforcing jig to allow a yawing movement of the vehicle restraint jigs.

One mode of the connecting jig comprises spherical slide bearings mounted in vicinities of both ends of the first reinforcing jig.

One mode of the vehicle restraint device further comprises a pair of pillar attachment members that are attached to the left and right seatbelt fixing pillars; a reinforcing jig that connects and reinforces the pair of pillar attachment members and is adjustable in length; a connecting jig that connects the one end sides of the vehicle restraint jigs to around both ends of the reinforcing jig; and spherical slide bearings that are provided at the connecting jig and are mounted on around both ends of the reinforcing jig.

One mode of the vehicle restraint device further comprises a connecting shaft that is attached to the left and right seatbelt fixing pillars of the vehicle; a connecting jig that connects the one end side of the vehicle restraint jig to the connecting shaft; and a spherical slide bearing that is provided at the connecting jig and is mounted on the connecting shaft.

One mode of the spherical slide bearing comprises an elastic member.

One mode of the vehicle restraint device further comprises a lateral deviation suppressing mechanism that suppresses a lateral deviation of the vehicle, which occurs at testing the vehicle by the vehicle testing device.

One mode of the lateral deviation suppressing mechanism comprises a buffering material that is brought into an elastic abutment with a body of the vehicle; a supporting member that supports the buffering material to be adjustable in a width direction of the vehicle; and a support portion to which the support member is attached.

One mode of the vehicle restraint device further comprises a deflection absorbing mechanism that absorbs deflection of the vehicle restraint jig, which occurs at testing the vehicle by the vehicle testing device.

One mode of the deflection absorbing mechanism comprises a jig receiving portion having a buffer material that is brought into an elastic abutment with the vehicle restraint jig having deflection in a gravity direction; and a support portion that supports the jig receiving portion to be rotatable in horizontal direction or vertical direction.

One mode of the vehicle restraint device further comprises a vibration damping device that is detachably attached to the vehicle restraint jig and damps vibration of the vehicle restraint jig, which occurs at testing of the vehicle by the vehicle restraint device One mode of the vibration damping device comprises an attachment member that is detachably attached to the vehicle restraint jig; an elastic member that is detachably attached to an outer side surface of a lower end portion of the attachment member; a shaft portion that has one end detachably attached to the elastic member and that is adjustable in length; and a weight portion that is detachably attached to another end of the shaft portion and that is adjustable in weight.

According to the present invention as above, one end side of a vehicle restraint jig is coupled to a vehicle that is required to be high in rigidity in its quality, and the other end side of the vehicle restraint jig is coupled to a pole. Therefore, it is possible to surely and strongly restrain a vehicle, while reproducing the vehicle pitching movement behavior.

EMBODIMENTS OF THE INVENTION

Prior to explaining a vehicle restraint device of the present invention, a vehicle using a vehicle restraint device of the present invention is briefly explained.

Figure 1:
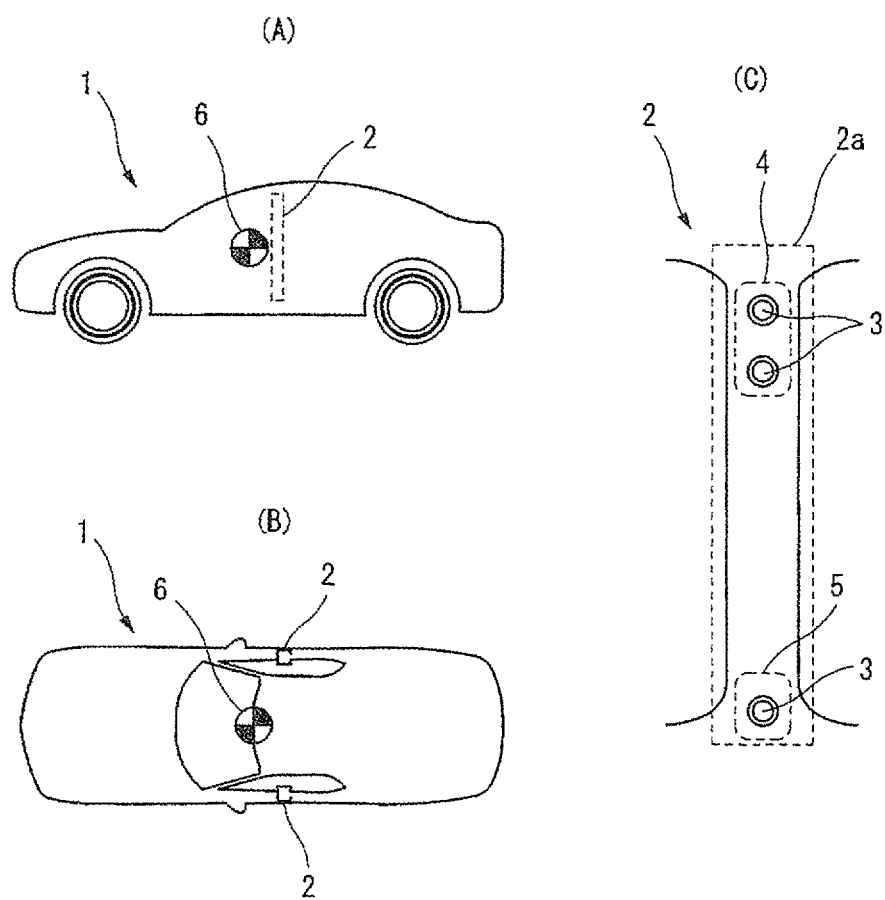
FIG. 1(A) is a schematic side view showing a vehicle seatbelt fixing pillar.
FIG. 1(B) is a schematic plan view of the pillars.
FIG. 1(C) is an expanded view of an essential part of the pillar.

FIGS. 1(A) and 1(B) are schematic side and plan views of a vehicle 1 using a vehicle restraint device of the present invention.

The vehicle 1 is equipped at its door sides with seatbelt fixing pillars 2 to which seatbelts (not shown in the drawings) are attached.

As shown in FIG. 1(C), upper and lower seatbelt fixing parts 4, 5 are attached to upper and lower end portions of the seatbelt fixing pillar 2 by a plurality of screws 3. A seatbelt is attached at its upper and lower ends to these upper and lower seatbelt fixing parts 4, 5. In FIGS. 1(A) and 1(B), numeral of 6 designates the vehicle's gravity center.

First Embodiment

FIGS. 2(A) and 2(B) are schematic side and plan views of a vehicle 1 using a vehicle restraint device 11 of the first embodiment.

The vehicle restraint device 11 is equipped with a pair of vehicle restraint jigs 12, 12 that are connected at their one end sides to left and right seatbelt fixing pillars 2 of the vehicle with tires 8 placed on rollers 7 of a chassis dynamometer and at the other end sides to left and right poles 10 on a floor surface 9.

The vehicle restraint jigs 12, 12 are made of a material having tensile strength and compressive strength that are necessary for restraining the back-and-forth movement of the vehicle, such as plate member, steel pipe member, etc. by a material superior in mechanical strength, such as steel plate, etc. The vehicle restraint jigs 12, 12 are equipped at their one end sides with length adjusting mechanisms 13, such as turnbuckles, that are capable of adjusting their lengths to conform to the vehicle length. Furthermore, a pair of left and right vehicle restraint jigs 12, 12 is provided at its center portion in the longitudinal direction with a tie rod 14 that couples both. The tie rod 14 is equipped at its center portion in the longitudinal direction with a length adjusting mechanism 15, such as turnbuckle, for adjusting the distance between the vehicle restraint jigs 12, 12 to conform to the vehicle width.

The vehicle restraint jigs 12, 12 are rotatably connected at their one end sides in the longitudinal direction to the seatbelt fixing pillars 2 through first link mechanisms 16, and are rotatably connected at the other end sides to poles 10 through second link mechanisms 17.

As shown in FIG. 2(A), the first link mechanism 16 is attached to an inner surface 2a of the seatbelt fixing pillar 2 such that a shaft 18 is positioned in the vicinity of the vehicle's gravity center 6. Furthermore, a shaft 21 of the second link mechanism 17 is also attached to the pole 10 to be positioned at a height that is generally the same as that of the vehicle's gravity center 6. The position in the vicinity of the vehicle's gravity center 6 refers to the position that has been made as close as possible to the vehicle's gravity center 6.

Figure 3:
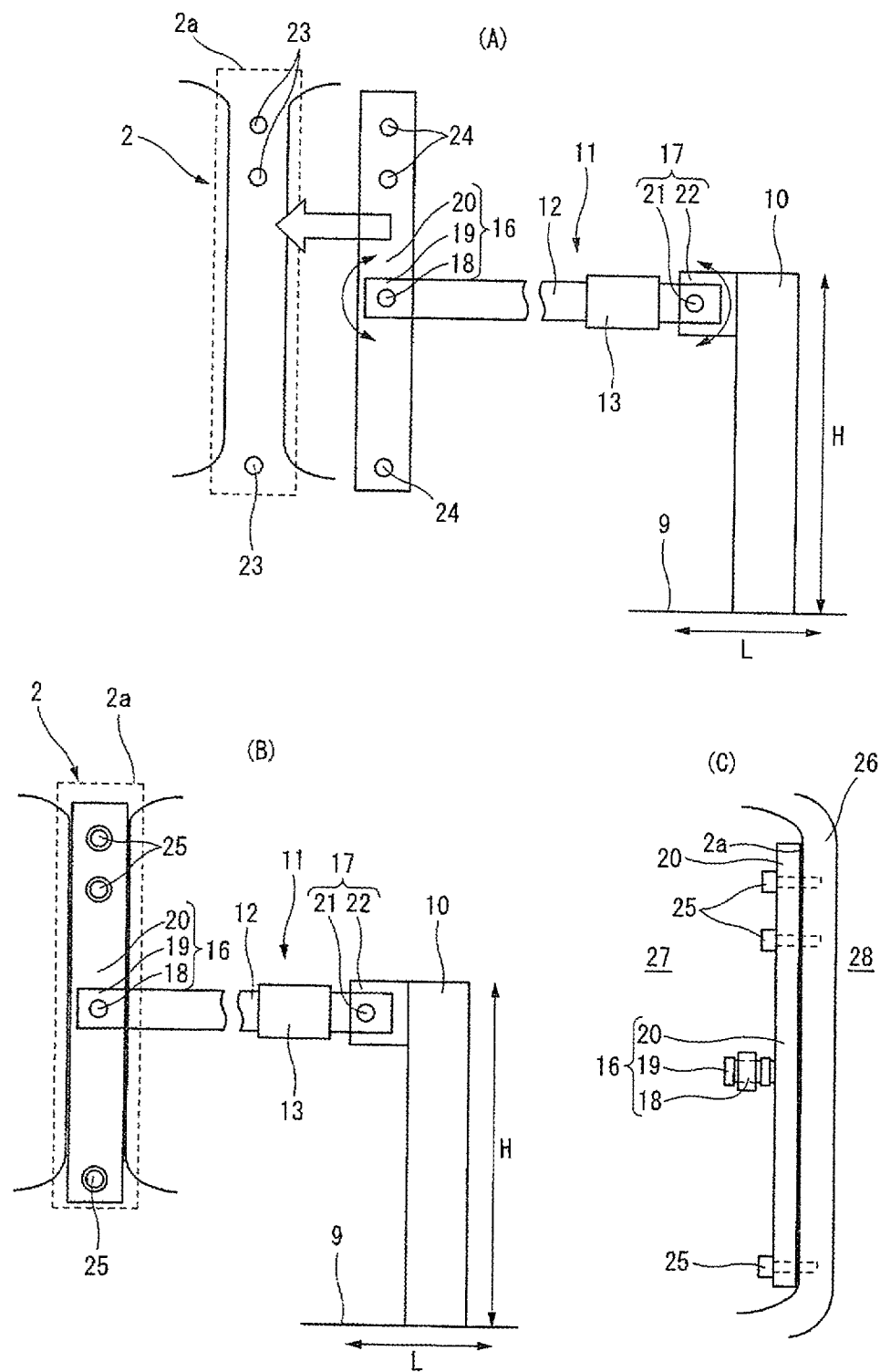
FIGS. 3(A), 3(B) and 3(C) are explanatory views showing one example of a method for attaching the vehicle restraint device to the seatbelt fixing pillar in the first embodiment.

As shown in FIG. 3, the first link mechanism 16 is equipped with the shaft 18, a bearing member 19 rotatably supporting the shaft 18, and an attachment member (hereinafter referred to as a pillar attachment member) for attaching this bearing member 19 to the inner surface 2a of the seatbelt fixing pillar 2.

The first link mechanisms 16 rotatably link one end sides in the longitudinal direction of the vehicle restraint jigs 12, 12 onto the inner surfaces 2a of the seatbelt fixing pillars 2 by the shafts 18, the bearing members 19, and the pillar attachment members 20.

The pillar attachment member 20 is formed in an elongate platy shape to match the seatbelt fixing pillar 2 and, in place of the seatbelt fixing parts 4, 5, is attached to the inner surface 2a of the seatbelt fixing pillar 2.

Furthermore, the second link mechanism 17 is equipped with a shaft 21, which is disposed on the other end side of the vehicle restraint jig 12, and a bearing member 22, and is attached to the pole 10 through the bearing member 22.

Next, an example of a method for attaching the vehicle restraint jig 12 to the seatbelt fixing pillar 2 is explained with reference to FIGS. 3(A), 3(B) and 3(C).

In this example, firstly, as shown in FIG. 3(A), one end side of the pair of left and right vehicle restraint jigs is attached to a center portion of the pillar attachment member 20 through the shaft 18 and the bearing member 19. On the other hand, the seatbelt fixing parts 4, 5 are removed from the seatbelt fixing pillar.

Then, as shown in FIGS. 3(B) and 3(C), the pillar attachment member 20 is attached to the inner surface 2a of the seatbelt fixing pillar 2. The attachment of the pillar attachment member 20 to the seatbelt fixing pillar 2 is conducted by mating threaded holes 23 of the seatbelt fixing pillar 2 with threaded holes 24 of the pillar attachment member 20 and threadedly engaging screws 25 into the threaded holes 23, 24. In FIG. 3(C), numerals 26, 27 and 28 respectively designate a vehicle frame, a vehicle interior, and a vehicle exterior.

Figure 2:
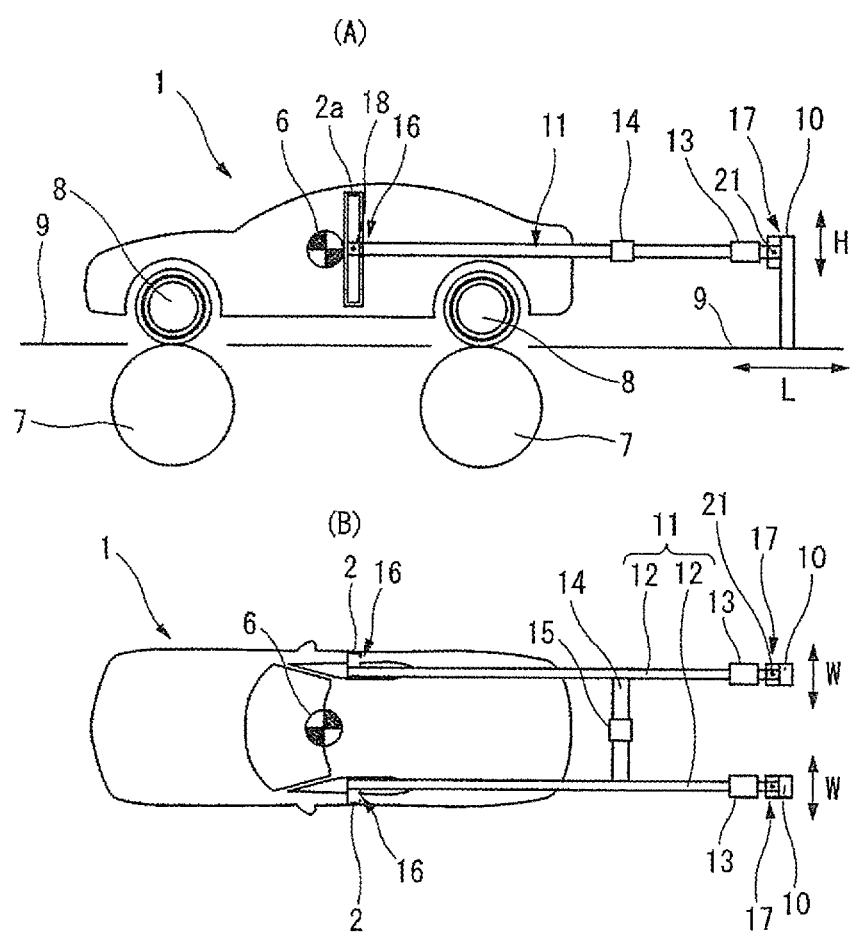
FIG. 2(A) is a schematic side view of a vehicle restraint device of the first embodiment of the present invention, in which a test vehicle is used.
FIG. 2(B) is a schematic plan view of the device.

The vehicle restraint device 11 of the first embodiment is structured as mentioned above. In its use, firstly, as shown in FIG. 2, the vehicle 1 is placed on the rollers 7 of the chassis dynamometer. One end side of the vehicle restraint jig 12 is linked to the seatbelt fixing pillar 2 of the vehicle 1 through the first link mechanism 16, thereby positioning the shaft 18 of the first link mechanism 16 in the vicinity of the vehicle's gravity center 6. On the other hand, the other end side of the vehicle restraint jig 12 is attached to the pole 10 through the second link mechanism 17. By adjusting the height of the pole 10, the shaft 21 of the second link mechanism 17 is set at generally the same height as that of the vehicle's gravity center to maintain the vehicle restraint jig 12 in a generally horizontal condition.

The vehicle 1 is restrained by the pair of left and right vehicle restraint jigs 12, and the rollers 7 are rotated to conduct various tests of the vehicle 1.

Since one end side of the vehicle restraint jig 12 is connected to the seatbelt fixing pillar 2 of high rigidity, it is possible to surely and strongly restrain the vehicle by the vehicle restraint jigs 12.

One end side of the vehicle restraint jig 12 is rotatably connected in the vicinity of the vehicle's gravity center 6 to the seatbelt fixing pillar 2 through the first link mechanism 16, and the other end side of the vehicle restraint jig 12 is rotatably connected to the pole 10 through the second link mechanism 17 at generally the same height as that of the vehicle's gravity center 6. Therefore, the vehicle (translational) back-and-forth movement is restrained, but the vehicle (rotational) pitching movement and the vehicle (translational) vertical movement become free. With this, it is possible to achieve the vehicle behavior of which vertical load is analogous to that on a road. Since it is possible make the vertical load added to the tires equal to that in the running condition, including acceleration and deceleration conditions, it becomes possible to conduct fuel consumption and exhaust gas tests by mode operation and vehicle behavior including tests of vehicle performance tests.

Furthermore, it is possible to adjust the length of the vehicle restraint jig 12 by the length adjusting mechanism 13. Therefore, the length is freely adjustable in accordance with the vehicle length of the vehicle 1.

The pole 10 is adjustable in at least one direction of vehicle width direction and vehicle length direction. Therefore, it can be applied to vehicles of various sizes by adjusting the vehicle restraint jigs 12 in accordance with vehicle width, vehicle length, etc.

Second Embodiment

Figure 4:
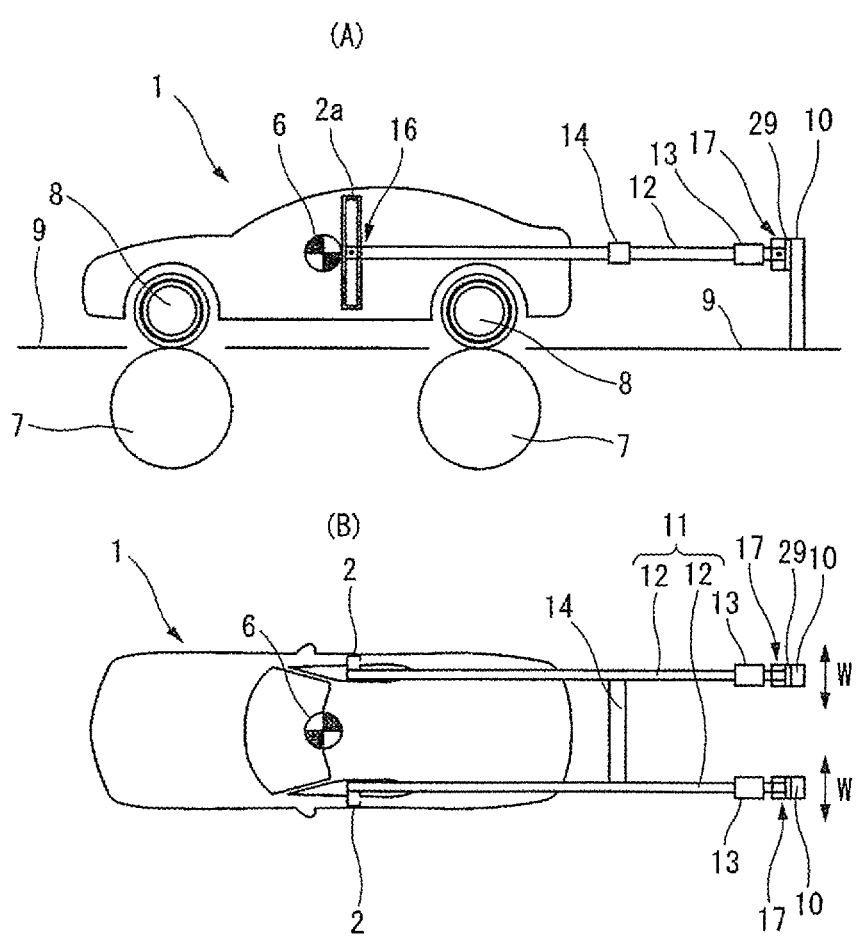
FIG. 4(A) is a schematic side view of a vehicle restraint device of the second embodiment of the present invention, in which a test vehicle is used.
FIG. 4(B) is a schematic plan view of the device.

FIG. 4 shows the second embodiment. The present embodiment is equipped with a restraint strength detector 29 between the second link mechanism 17 and the pole 10 in the mode of the first embodiment. This restraint detector 29 detects the vehicle restraint strength. The attachment position of the restraint detector 29 is not limited to between the second link mechanism 17 and the pole 10, but may be between the vehicle restraint jig 12 and the second link mechanism 17 or between the first link mechanism 16 and the seatbelt fixing pillar 2, etc., as long as it is a position where the restraint strength of the vehicle 1 can surely be detected. Since the vehicle restraint device 11 of the present embodiment can detect the restraint strength of the vehicle 1, it becomes possible to conduct measurement and analysis/evaluation of characteristics on vehicle spring in addition to advantageous effects of the first embodiment.

Third Embodiment

Figure 5:
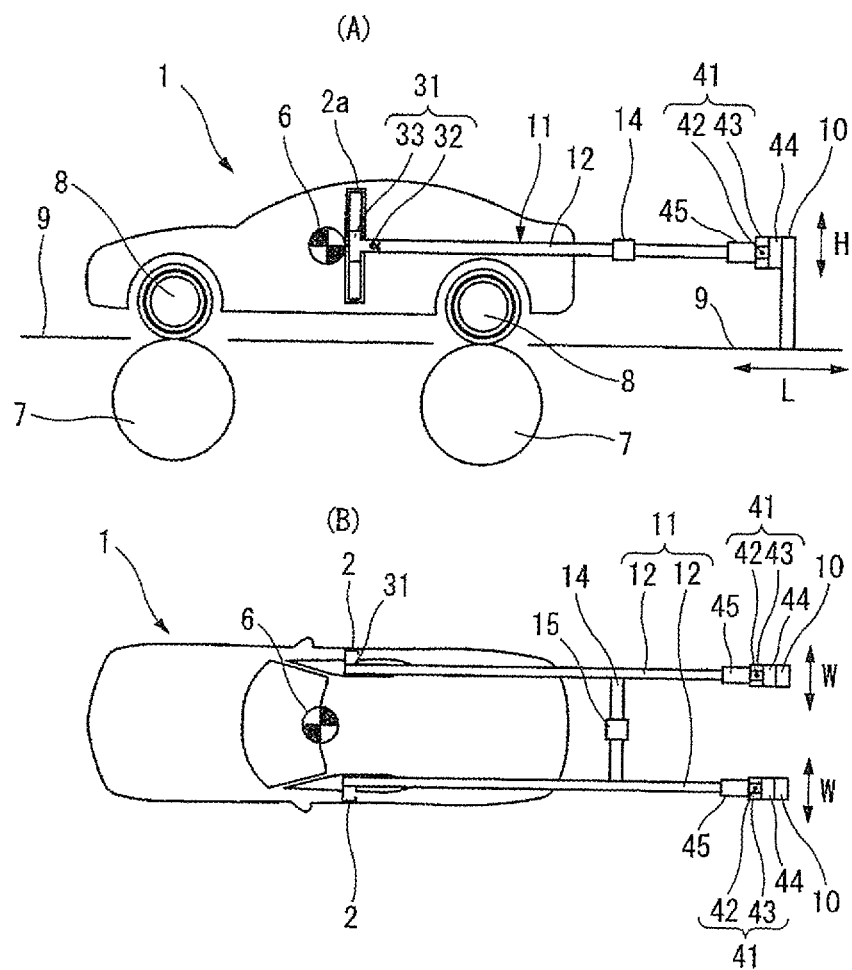
FIG. 5(A) is a schematic side view of a vehicle restraint device of the third embodiment of the present invention, in which a test vehicle is used.
FIG. 5(B) is a schematic plan view of the device.

FIG. 5 to FIG. 9 show the third embodiment. In this embodiment, as shown in FIG. 5, the first link mechanism 31, which rotatably connects one end side of the vehicle restraint jig 12 to the seatbelt fixing pillar 2, is equipped with a tubular shaft portion 32 for rotatably attaching one end side of the vehicle restraint jig 12 and with a shaft supporting arm 33 for attaching this shaft portion 32 to the seatbelt fixing pillar 2.

Figure 6:
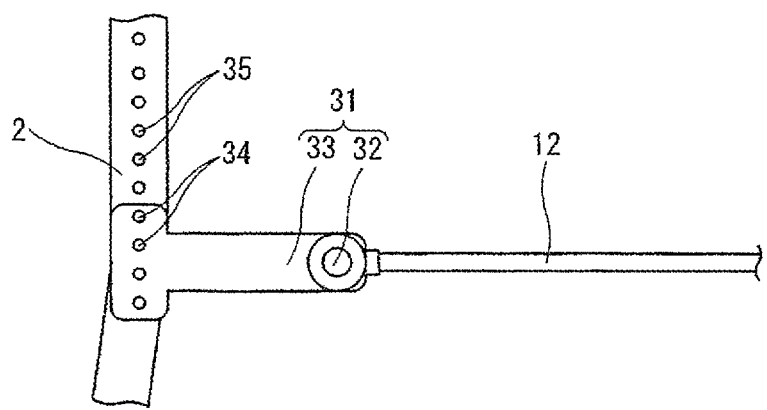
FIG. 6 is a side view of a first link mechanism of the third embodiment.
Figure 7:
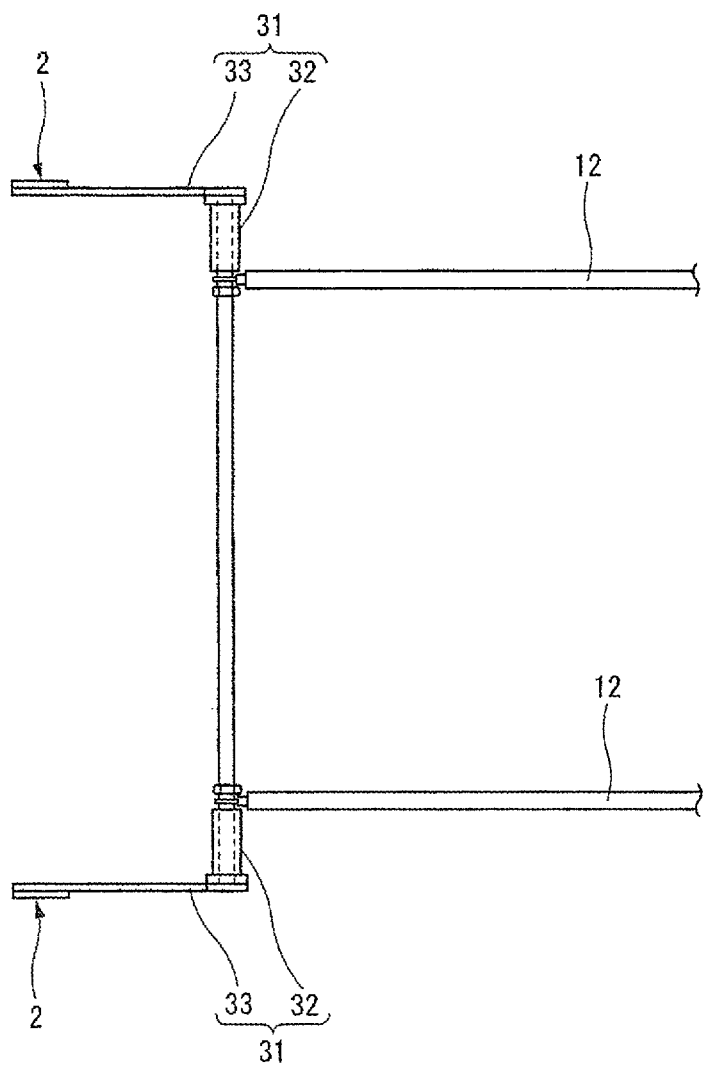
FIG. 7 is a plan view of the first link mechanism of the third embodiment.
Figure 8:
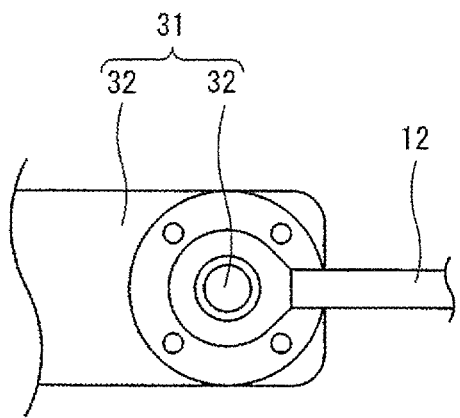
FIG. 8 is a sectional view of a shaft portion of the first link mechanism of the third embodiment.

As shown in FIG. 6 to FIG. 8, the shaft supporting arm 33 is formed in a generally T-shape, is provided on its one end side with the shaft portion 32, and is attached at the other end side to the seatbelt fixing pillar 2 by screws 34. It is possible to adjust the attachment height position of the shaft supporting arm 33 by selectively using screw holes 35 formed through the seatbelt fixing pillar 2.

The reason why the shaft supporting arm 33 is formed in a generally T-shape is to avoid an interference between the shaft portion 32 and the driver's seat or front passenger's seat by displacing the position of the shaft portion 32 in the back-and-forth direction relative to the position of the seatbelt fixing pillar 2 when the shaft supporting arm 33 has been attached to the seatbelt fixing pillar 2. Therefore, its shape is not limited as long as it is possible to avoid the interference. It is optional to make the shaft supporting arm 33 and the shaft portion 32 telescopic to adjust their lengths.

Figure 9:
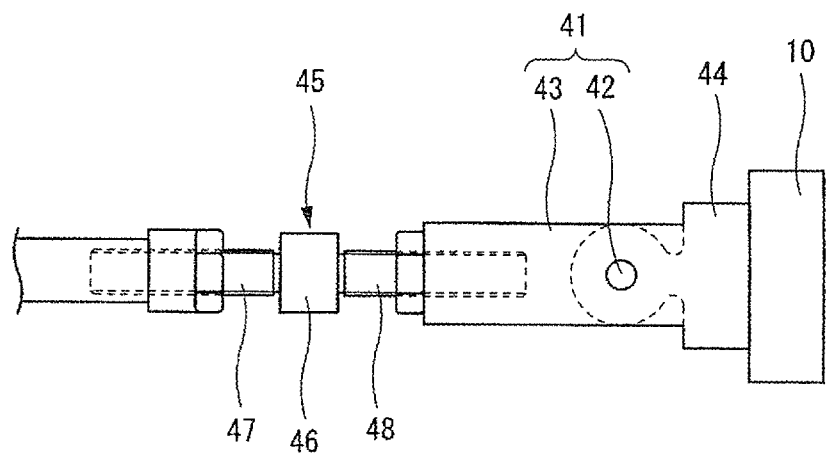
FIG. 9 is a side view of a second link mechanism and a length adjusting mechanism of the third embodiment.

Furthermore, as shown in FIG. 5 and FIG. 9, the second link mechanism 41 for rotatably attaching the other end side of the vehicle restraint jig 12 to the pole 10 is equipped with a shaft portion 42 provided on the other end side of the vehicle restraint jig 12 and a bearing member 43 rotatably supporting this shaft portion 42 and is attached to the pole 10 through a bracket 44.

The bracket 44 is elevatably attached to the pole 10 by a height adjusting mechanism not shown in the drawings such that the height position of the second link mechanism 41 is adjustable.

End portions on the side of the bearing members 43 of a pair of left and right vehicle restraint jigs 12 are provided with length adjusting mechanisms 45, such as turnbuckles. In the length adjusting mechanism 45, when a rotational operation body 46 at its center portion is rotated, bolts 47, 48 provided on left and right sides of the rotational operation body 46 are rotated in the opposite left and right directions such that the length of the vehicle restraint jig 12 is adjustable to correspond to the vehicle length. Since other structures are similar to those of the first and second embodiments, the same structural parts are designated by the same symbols and repetitive explanations are omitted.

Next, an example of a method of using the vehicle restraint device 11 of the third embodiment is explained.

Firstly, the shaft supporting arm 33 of the first link mechanism 31 on one end side of the vehicle restraint jig 12 is attached to a desired height position of the seatbelt fixing pillar 2. Then, if necessary, the length of the shaft supporting arm 33 and/or the length of the shaft portion 32 is adjusted to avoid an interference of the shaft portion 32 of the first link mechanism 31 with the driver's seat or the front passenger's seat.

Next, the other end side of the vehicle restraint jig 12 is attached to the pole 10 through the second link mechanism 41 and the bracket 44.

The length and/or the width of a pair of left and right vehicle restraint jigs 12, 12 is adjusted to restrain the vehicle 1, the rollers 7 are rotated, and various tests of the vehicle 1 are conducted.

In the vehicle restraint device 11 of the third embodiment, as well as the length adjustment and the width adjustment of the vehicle restraint jigs 12, 12, it is possible to avoid an interference of the shaft portion 32 of the first link mechanism 31 with the driver's seat or the front passenger's seat, since the position of the shaft portions 32 of the first link mechanisms 31, by which one end sides of the vehicle restraint jigs 12, 12 are rotatably attached to the seatbelt fixing pillars 2, has been spaced away from the position of the seatbelt fixing pillars 2 by the shaft supporting arms 33.

Furthermore, the second link mechanism 41 is elevatably attached to pole 10. Therefore, there is an advantageous effect that it is possible to elevate or lower the second link mechanism 41 to adjust the second link mechanism 41 to the height position of the first link mechanism 31 to maintain the vehicle restraint jig 12 in a generally horizontal condition to conduct various tests. Other structures and advantageous effects are the same as those of the vehicle restraint devices of the first and second embodiments. Therefore, repetitive explanations are omitted.

Fourth Embodiment

Figure 10:
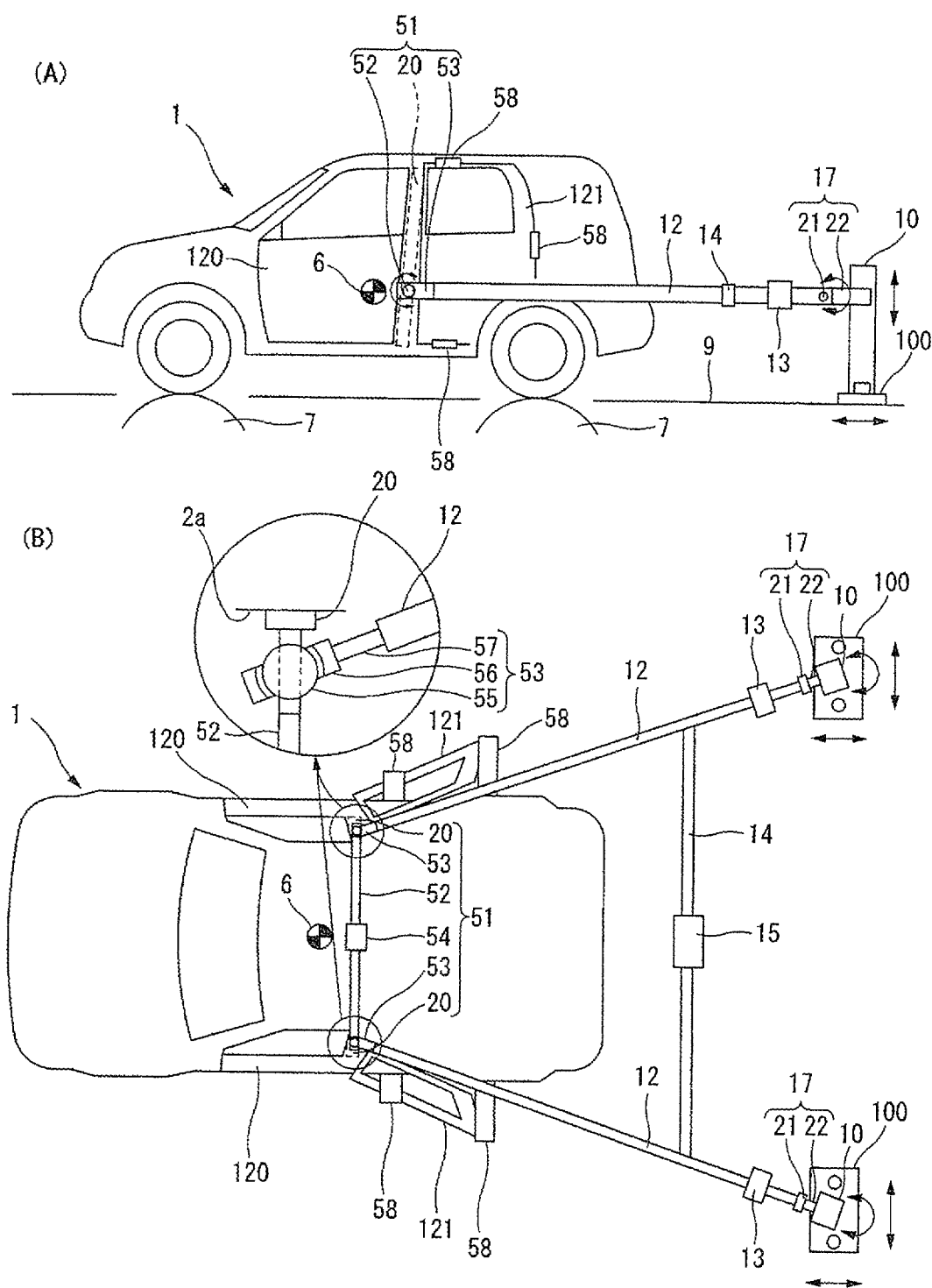
FIG. 10(A) is a schematic side view of a vehicle restraint device of the fourth embodiment of the present invention, in which a test vehicle is used.
FIG. 10(B) is a schematic plan view of the device and an enlarged view of the first link mechanism.
Figure 11:
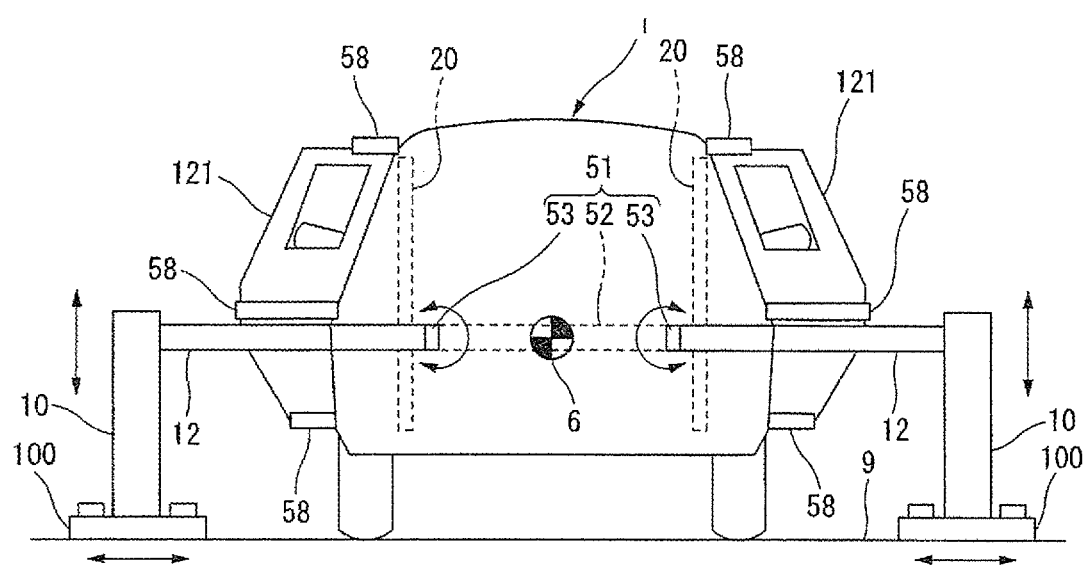
FIG. 11 is a schematic rear view of the vehicle restraint device of the fourth embodiment.

FIG. 10 and FIG. 11 show the fourth embodiment. The present embodiment is equipped with a first link mechanism 51, in place of the first link mechanism 16 in the mode of the first embodiment.

The first link mechanism 51 is equipped with a reinforcing jig 52 that is adjustable in length and connects and reinforces a pair of pillar attachment members 20 that is attached to inner surfaces 2a of left and right seatbelt fixing pillars 2 in the vehicle, and connecting jigs 53 that connect the vehicle restraint jigs 12 to be omnidirectionally rotatable in outer backward directions of the vehicle 1 in the vicinity of both ends of this reinforcing jig 52.

The reinforcing jig 52 is formed of a cross member for connecting the pair of pillar attachment members 20. The reinforcing jig 52 is equipped with a length adjusting mechanism 54 for adjusting its length. The reinforcing jig 52 is attached to the pair of pillar attachment members 20 in a manner that its arrangement is adjustable in the vehicle height direction (for example, generally the same height as the vehicle gravity center 6).

The connecting jig 53 is formed of a pillow ball 55 that is mounted and fixed in the vicinity of one end of the reinforcing jig 52, a spherical bearing portion 56 for receiving this pillow ball 55, and a connecting jig 57 for connecting this spherical bearing 56 with the vehicle restraint jig 12.

With reference to FIG. 10 and FIG. 11, an exemplary use of the vehicle restraint device 11 of the present embodiment is explained.

For example, in a vehicle 1 having rear seat doors 121, firstly, there is made a condition where the rear seat doors 121 have been removed or a condition where the rear seat doors 121 opened have been fixed by door restraint jigs 58. Alternatively, there is made a condition where doors 120 of the driver's seat and the front passenger's seat of the vehicle 1 have been removed or a condition where the doors 120 opened have been fixed by door restraint jigs 58.

As the door restraint jig 58, various restraint jigs, such as fixing by suction cups, may be cited. Since it suffices to be able to achieve the fixing in a manner to avoid a contact between the rear seat doors 121 and the vehicle restraint jigs 12, a known restraint jig may be applied without particular limitations. Since it suffices to be able to achieve the fixing in a manner to avoid a contact between the rear seat doors 121 and the vehicle restraint jigs 12, the arrangement position and the number of the door restraint jig 58 are not particularly limited.

Then, one ends of the vehicle restraint jigs 12 obliquely inserted into the vehicle 1 from rear outside positions of the vehicle 1 are connected to both connecting jigs 53 in the first link mechanism 51 attached inside of the vehicle 1. The vehicle restraint jig 12 connected to this connecting jig 53 becomes omnidirectionally rotatable in outer backward directions of the vehicle 1. Then, the other end side of the vehicle restraint jig 12 is rotatably connected to the pole 10 through the second link mechanism at generally the same height position as that of the vehicle gravity center 6.

Then, the lengths of the vehicle restraint jigs 12, 12 are adjusted by the length adjusting mechanisms 13, and the distance between the vehicle restraint jigs 12, 12 is adjusted by the length adjusting mechanism 15. Furthermore, in a base portion 100 on the floor surface, the pole 10 is suitably adjusted in terms of its height, arrangement in the back-and-forth direction or width direction of the vehicle 1, and the connection direction relative to the vehicle restraint jig 12.

As above, after restraining the vehicle 1, various tests of the vehicle 1 are conducted by rotating the rollers 7 of the chassis dynamometer.

According to the above vehicle restraint device 11 of the present embodiment, one end side of the vehicle restraint jig 12 is rotatably connected on the inner surface 2a of the seatbelt fixing pillar 2 by the first link mechanism 51, and in contrast the other end side of the vehicle restraint jig 12 is rotatably connected at the pole 10 by the second link mechanism 17. Therefore, similar to the vehicle restraint device 11 of the first embodiment, it is possible to surely and strongly restrain the vehicle 1. Furthermore, the vehicle (translational) back-and-forth movement is restrained, but the vehicle (rotational) pitching movement and the vehicle (translational) vertical movement become free. With this, it is possible to achieve the vehicle behavior of which vertical load is analogous to that on a road. Since it is possible to make the vertical load added to the tires equal to that in the running condition, including acceleration and deceleration conditions, it becomes possible to conduct fuel consumption and exhaust gas tests by mode operation and vehicle behavior including tests of vehicle performance tests.

In particular, in the present embodiment, it is possible to obliquely connect the vehicle restraint jig 12 to around one end of the reinforcing jig 52 in the vehicle 1 through the connecting jig 53 from a rear outside position of the vehicle 1 in a condition where the rear seat door 121 of the vehicle 1 has been removed or is open and fixed. Therefore, adjusting the connection position between the vehicle 1 and the vehicle restraint jig 12 to around the vehicle gravity center 6 of the vehicle 1 becomes easy, without having an influence of the rear seat, the trunk room shape, etc. Furthermore, it is possible to minimize remodeling of the vehicle 1, which was necessary when applying the vehicle 1 to a vehicle test device. With this, it becomes possible to shorten the the test preparation time.

Furthermore, the vehicle restraint jigs 12 are omnidirectionally rotatable in outer backward directions of the vehicle 1 by the connecting jigs 53 in the vicinities (around both ends of the reinforcing jig 52 in the present embodiment) of the pillar attachment members 20. Therefore, it is possible to freely set the vehicle restraint jig 12 until the height in the vicinity of the vehicle gravity center 6 in accordance with the space in the vehicle 1 where the vehicle restraint jig 12 is inserted. With this, it is possible to suppress a pitching movement (e.g., overawing) of the vehicle 1 that is different from running on a road and can happen at testing the vehicle 1 in case that it is forced to restrain the vehicle 1 at a height position that is away from the vehicle gravity center 6 to avoid a physical interference with the rear seat, the trunk room, etc. of the vehicle 1.

Furthermore, a pair of pillar attachment members 20 opposing to each other in the vehicle 1 is connected and reinforced with the reinforcing jig 52. Furthermore, since it is in a condition where the vehicle restraint jigs 12 are connected at around both ends of this reinforcing jig 52 through the connecting jigs 53, load factor of moment (torque) of the vehicle restraint jigs 12 relative to the reinforcing jig 52 is reduced. With this, it is possible to prevent deformation of the reinforcing jig 52 and the subsequent deformation or breaking of the pillar attachment members 20. Furthermore, since the length of the reinforcing jig 52 is adjustable by the length adjusting mechanism 54, it can freely be applied in accordance with the size of the vehicle 1. Furthermore, since the reinforcing jig 52 is adjustable in the vehicle height direction of the vehicle 1 in the pair of pillar attachment members 20, it is possible to freely set the arrangement of the reinforcing jig 52 until the height in the vicinity of the vehicle gravity center 6 in accordance with the size of the vehicle 1.

As is clear from the above explanation, the vehicle restraint device 11 of the present embodiment is effective for restraining the vehicle 1, for example, of a four door type.

In case that the pillar attachment members 20 are sufficiently assured in rigidity by selecting their structural materials, the first link mechanism 51 does not necessarily require the reinforcing jig 52. In this case, for example, the pillow ball 55 of the connecting jig 53 is mounted and fixed to a short fixing shaft that is integrally formed on the pillar attachment member 20.

Fifth Embodiment

Figure 12:
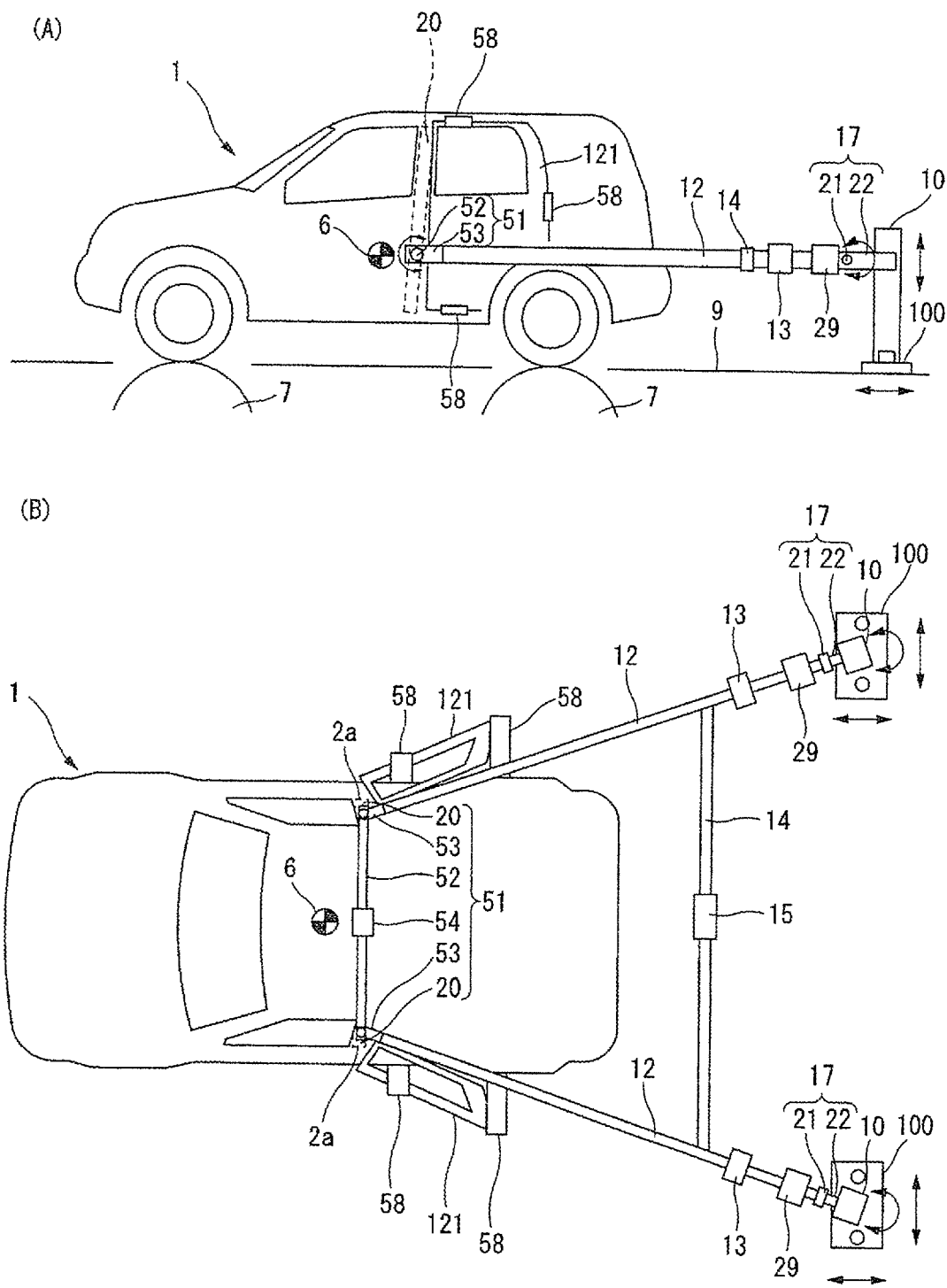
FIG. 12(A) is a schematic side view of a vehicle restraint device of the fifth embodiment of the present invention, in which a test vehicle is used.
FIG. 12(B) is a schematic plan view of the device.

FIG. 12 shows the fifth embodiment. The present embodiment is equipped with a restraint strength detector 29 between the vehicle restraint jig 12 and the second link mechanism 17 in the mode of the fourth embodiment. This restraint detector 29 detects the vehicle restraint strength. The attachment position of the restraint detector 29 is not limited to between the vehicle restraint jig 12 and the second link mechanism 17, but may be between the second link mechanism 17 and the pole 10 or between the first link mechanism 16 and the seatbelt fixing pillar 2, etc., as long as it is a position where the restraint strength of the vehicle 1 can surely be detected. Since the vehicle restraint device 11 of the present embodiment can detect the restraint strength of the vehicle 1, it becomes possible to conduct measurement and analysis/evaluation of characteristics on vehicle spring in addition to advantageous effects of the fourth embodiment.

Sixth Embodiment

FIGS. 13(A) and 13(B) show the sixth embodiment. The present embodiment has the same mode as that of the fourth embodiment, except in that one end sides of the vehicle restraint jigs 12 are obliquely and rotatably connected to a pair of left and right seatbelt fixing pillars 2 of the vehicle 1 through the first link mechanism 51 at positions in the vicinity of the vehicle gravity center 6 from rear inside positions of the vehicle 1.

Figure 13:
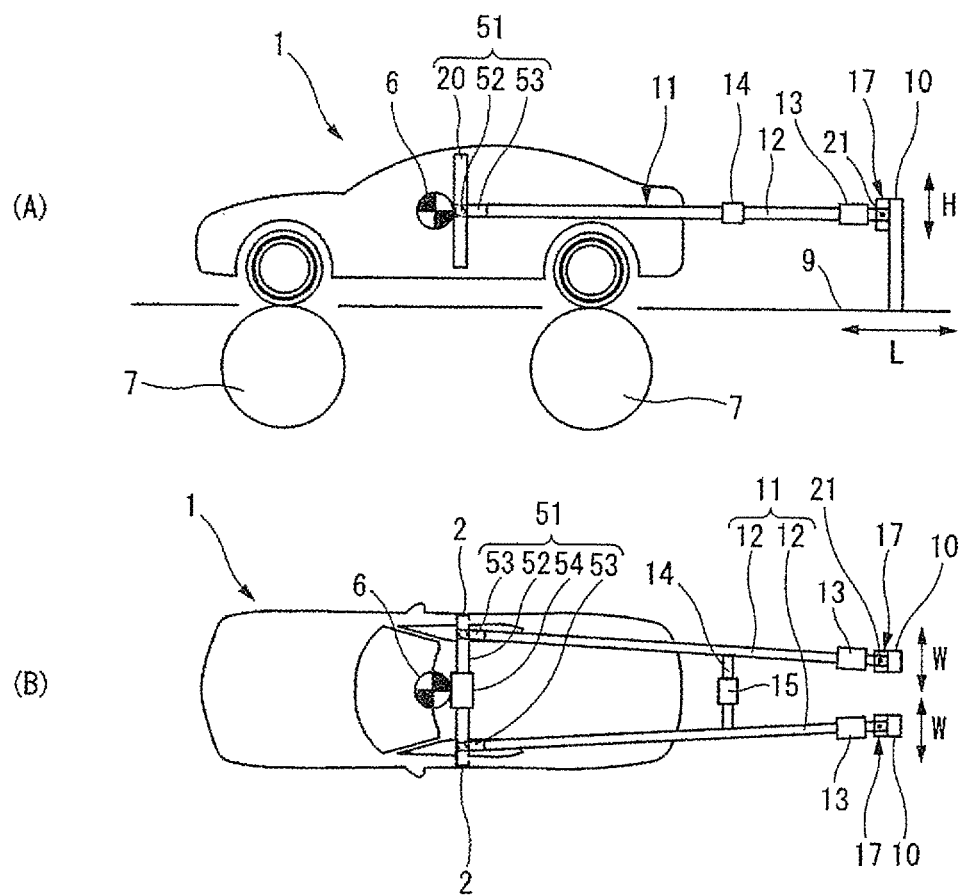
FIG. 13(A) is a schematic side view of a vehicle restraint device of the sixth embodiment of the present invention, in which a test vehicle is used.
FIG. 13(B) is a schematic plan view of the device.

With reference to FIG. 13, an exemplary use of the vehicle restraint device 11 of the present embodiment is explained.

For example, in case that the test vehicle is a vehicle 1 having a back door exemplified in hatch-back type vehicles, the back door of this vehicle 1 is opened, and this door is turned into a fixed condition by a door restraint jig 58 not shown in the drawings. Then, one ends of the vehicle restraint jigs 12 obliquely inserted into the vehicle 1 from rear inside positions of the vehicle 1 are connected to the connecting jigs 53 of the first link mechanism 51 attached inside of the vehicle 1. The vehicle restraint jig 12 connected to this connecting jig 53 becomes omnidirectionally rotatable in inner backward directions of the vehicle 1. Then, similar to the fourth embodiment, the other end side of the vehicle restraint jig 12 is rotatably connected to the pole 10 through the second link mechanism 17 at generally the same height position as that of the vehicle gravity center 6. Furthermore, the lengths of the vehicle restraint jigs 12, 12 and the distance therebetween are respectively adjusted by the length adjusting mechanisms 13, 15. The pole 10 is also adjusted in terms of its height, arrangement in the back-and-forth direction or transverse direction, and the connection direction relative to the vehicle restraint jig 12. As above, after restraining the vehicle 1, various tests of the vehicle 1 are conducted by rotating the rollers 7 of the chassis dynamometer.

As above, according to the vehicle restraint device 11 of the present embodiment too, one end side of the vehicle restraint jig 12 is rotatably connected on the inner surface 2a of the seatbelt fixing pillar 2 by the first link mechanism 51, and in contrast the other end side of the vehicle restraint jig 12 is rotatably connected at the pole 10 by the second link mechanism 17. Therefore, similar to the vehicle restraint device 11 of the fourth embodiment, it is possible to surely and strongly restrain the vehicle 1. Furthermore, the vehicle (translational) back-and-forth movement is restrained, but the vehicle (rotational) pitching movement and the vehicle (translational) vertical movement become free. With this, it is possible to achieve the vehicle behavior of which vertical load is analogous to that on a road.

In particular, in the present embodiment, it is possible to obliquely connect the vehicle restraint jig 12 to around one end of the reinforcing jig 52 in the vehicle 1 from a rear inside position of the vehicle 1. Therefore, adjusting the connection position between the vehicle 1 and the vehicle restraint jig 12 to around the vehicle gravity center 6 of the vehicle 1 becomes easy, while reducing a physical interference with the rear tire house, the rear door opening portion, etc. of the vehicle 1. Furthermore, it is possible to minimize remodeling of the vehicle 1, which was necessary when applying the vehicle 1 to a vehicle test device. With this, it becomes possible to shorten the the test preparation time.

Furthermore, the vehicle restraint jigs 12 are omnidirectionally rotatable in inner backward directions of the vehicle 1 by the connecting jigs 53 in the vicinities (around both ends of the reinforcing jig 52 in the present embodiment) of the pillar attachment members 20. Therefore, it is possible to freely set the vehicle restraint jig 12 until the height in the vicinity of the vehicle gravity center 6 in accordance with the space in the vehicle 1 where the vehicle restraint jig 12 is inserted. With this, it is possible to suppress a pitching movement (e.g., overswing) of the vehicle 1 that is different from running on a road and can happen at testing the vehicle 1 in case that it is forced to restrain the vehicle 1 at a height position that is away from the vehicle gravity center 6 to avoid a physical interference with the rear tire house, the back door opening portion, etc. of the vehicle 1.

Furthermore, a pair of pillar attachment members 20 opposing to each other in the vehicle 1 is connected by the reinforcing jig 52, and it is in a condition where the vehicle restraint jigs 12 are connected at around both ends of this reinforcing jig 52 through the connecting jigs 53. Therefore, similar to the fourth embodiment, the pillar attachment members 20 are reinforced. Furthermore, since load factor of moment (torque) of the vehicle restraint jigs 12 relative to the reinforcing jig 52 is reduced, it is possible to prevent deformation of the reinforcing jig 52 and the subsequent deformation or breaking of the pillar attachment members 20. Furthermore, since the length of the reinforcing jig 52 is adjustable by the length adjusting mechanism 54, it can freely be applied in accordance with the size of the vehicle 1.

As is clear from the above explanation, the vehicle restraint device 11 of the present embodiment is effective for restraining, for example, the vehicle 1 of a two door type or the vehicle 1 having a back door.

In the present embodiment too, in case that the pillar attachment members 20 are sufficiently assured in rigidity by selecting their structural materials, the first link mechanism 51 does not necessarily require the reinforcing jig 52. In this case too, as mentioned above, it suffices to adopt a mode in which the pillow ball 55 of the connecting jig 53 is mounted and fixed to a short fixing shaft that is formed on the pillar attachment member 20.

Seventh Embodiment

Figure 14:
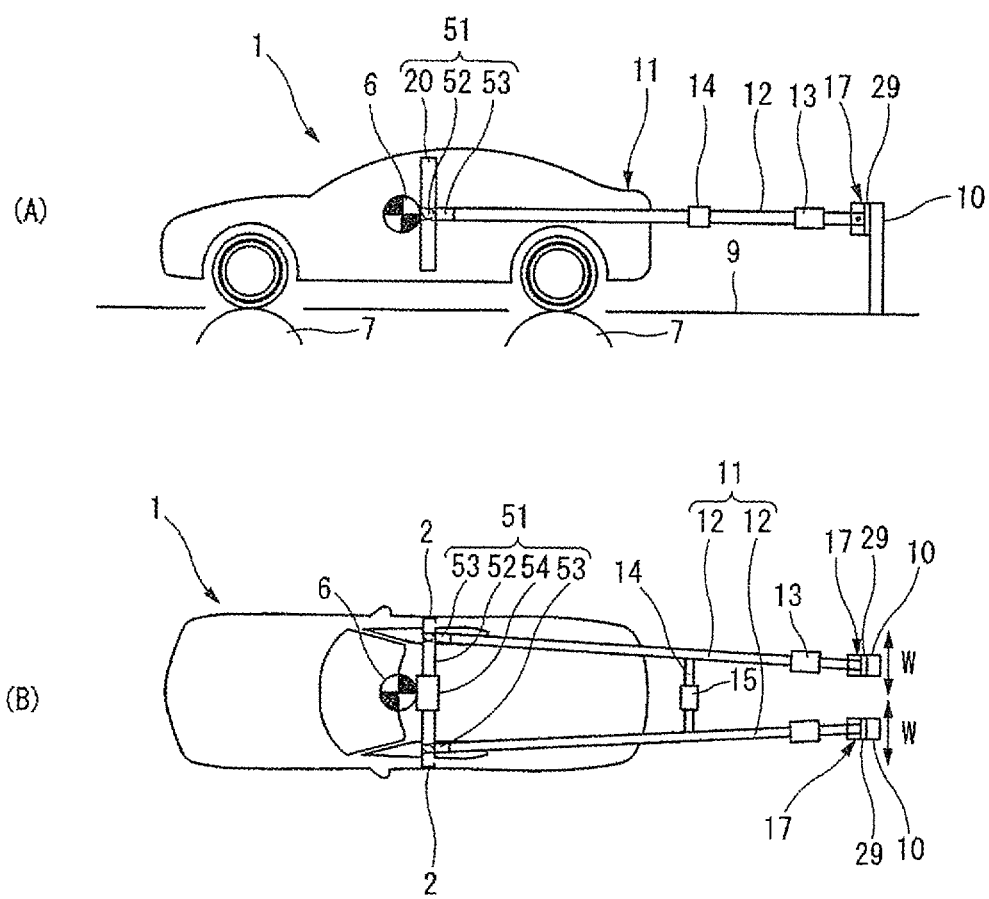
FIG. 14(A) is a schematic side view of a vehicle restraint device of the seventh embodiment of the present invention, in which a test vehicle is used.
FIG. 14(B) is a schematic plan view of the device.

FIGS. 14(A) and 14(B) show the seventh embodiment. The present embodiment is equipped with a restraint strength detector 29 between the second link mechanism 17 and the pole 10 in the mode of the sixth embodiment. This restraint detector 29 detects the vehicle restraint strength. The attachment position of the restraint detector 29 is not limited to between the second link mechanism 17 and the pole 10, but may be between the vehicle restraint jig 12 and the second link mechanism 17 or between the first link mechanism 16 and the seatbelt fixing pillar 2, etc., as long as it is a position where the restraint strength of the vehicle 1 can surely be detected. Since the vehicle restraint device 11 of the present embodiment mentioned above can detect the restraint strength of the vehicle 1, it becomes possible to conduct measurement and analysis/evaluation of characteristics on vehicle spring in addition to advantageous effects of the sixth embodiment.

Eighth Embodiment

Figure 15:
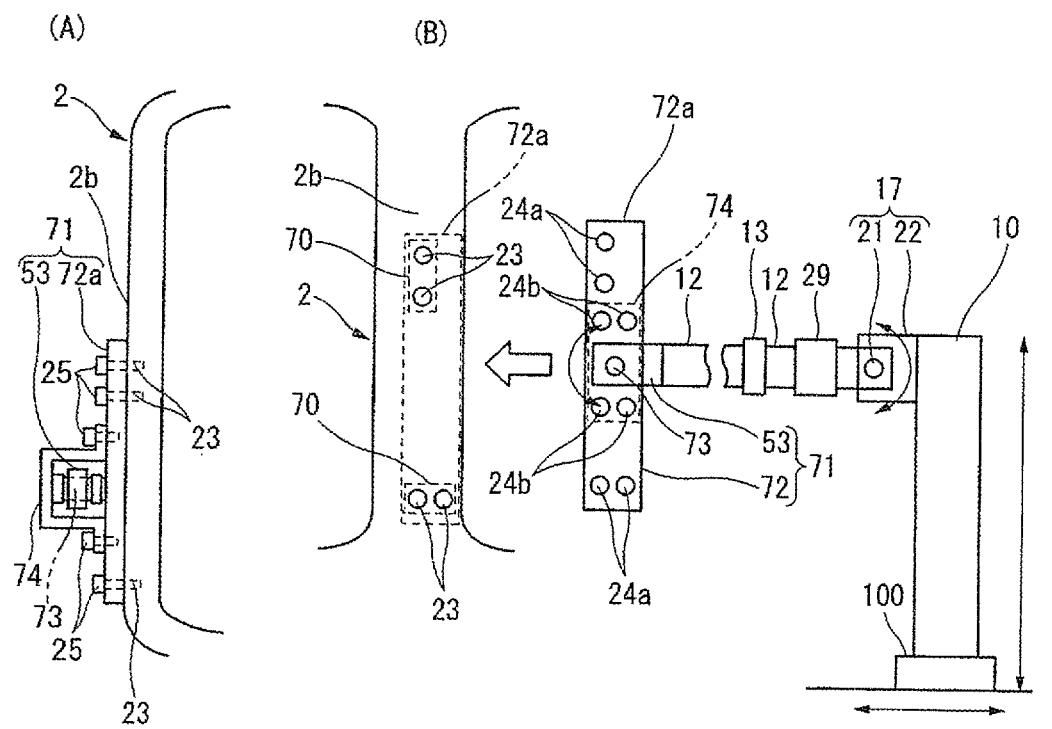
FIGS. 15(A), 15(B) and 15(C) are explanatory views showing one example of a method for attaching the vehicle restraint device to the seatbelt fixing pillar in the eighth embodiment.
Figure 16:
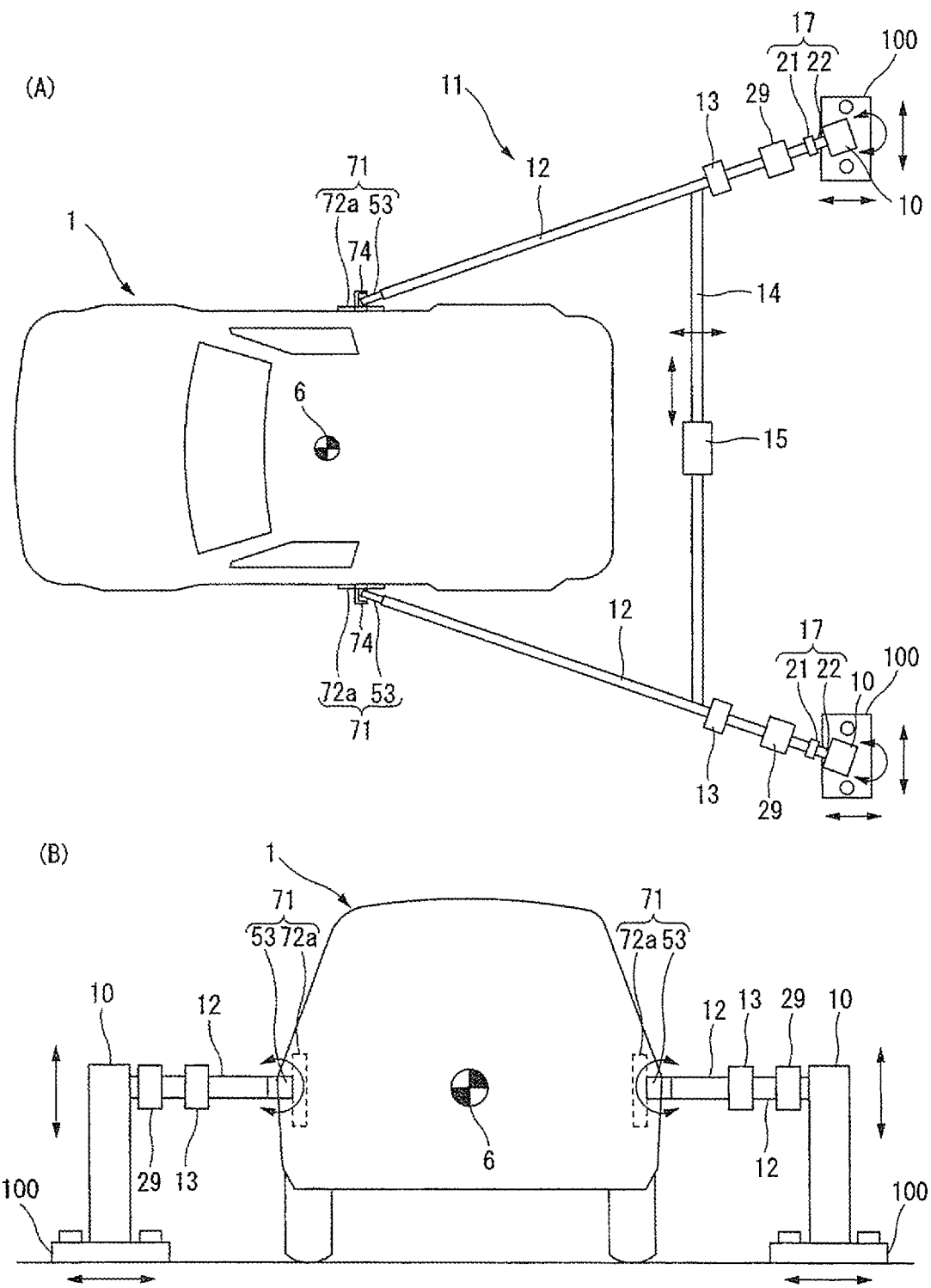
FIG. 16(A) is a schematic plan view of a vehicle restraint device of the eighth embodiment of the present invention, in which a test vehicle is used.
FIG. 16(B) is a schematic rear view of the device.

The vehicle restraint device 11 of the eighth embodiment shown in FIGS. 15, 16 is equipped with a first link mechanism 71, in place of the first link mechanism 51 in the mode of the fourth embodiment.

The first link mechanisms 71 are equipped with a pair of pillar attachment members 72a that are attached to outer surfaces 2b of the left and right seatbelt fixing pillars 2, connecting shafts 73 that are attached to outer surfaces of this pair of pillar attachment members 72a, connecting jigs 53 that are mounted on these connecting shafts 73 for connecting the vehicle restraint jigs 12 to be omnidirectionally rotatable in outer backward directions of the vehicle 1, and pressing members 74 that press and fix the connecting shafts 73 against the pillar attachment members 72a.

The pillar attachment member 72a is formed with screw holes 24a, into which screws 25 for fixing this pillar attachment member 72a on the outer surface 2b of the seatbelt fixing pillar 2 are threadedly engaged, and screw holes 24b, into which screws 25 for fixing the pressing member 74 on the pillar attachment member 72a are threadedly engaged. In the pillar attachment member 72a, the arrangement of the connecting shaft 73 is adjustable in the vehicle height direction.

With reference to FIG. 15 and FIG. 16, an exemplary use of the vehicle restraint device 11 of the present embodiment is explained.

Firstly, on the outer surfaces 2b of the left and right seatbelt fixing pillars 2 of the vehicle 1, from portions 70 attaching rear seat doors and door hinge metal members, the doors and the hinge metal members are removed.

On the other hand, the connecting shaft 73 having the connecting jig 53 mounted and fixed thereon is projectingly arranged in advance on the outer surface of the pillar attachment member 72a. Furthermore, the pressing member 74 in a condition where this connecting shaft 73 is pressed is fixed onto the pillar attachment member 72a.

Next, in a condition where the screw holes 24a of the pillar attachment member 72a have been mated with the screw holes 23 of the attachment portion 70 on the outer surface 2b of the seatbelt fixing pillar 2, the screws 25 are threadedly engaged into these screw holes 23, 24a. In this way, the pillar attachment member 72a is fixed onto the outer surface 2b of the seatbelt fixing pillar 2, thereby attaching the first link mechanism 71 to the outer surface 2b. One end of the vehicle restraint jig 12 obliquely inserted into the vehicle 1 from a rear outside position of the vehicle 1 is connected to the connecting jig 53 of the first link mechanism 71 attached to the outer surface 2b of the seatbelt fixing pillar 2 to be positioned in the vicinity of the vehicle gravity center 6 shown in FIG. 15(C). This vehicle restraint jig 12 connected to the connecting jig 53 becomes omnidirectionally rotatable in outer backward directions of the vehicle 1 by the pillow ball 55 (FIG. 10) of the connecting jig 53.

Next, similar to the fourth embodiment, the lengths of the vehicle restraint jigs 12, 12 are adjusted by the length adjusting mechanisms 13. Furthermore, the other ends of the vehicle restraint jigs 12, 12 are rotatably connected to the poles 10 through the second link mechanisms 17 at generally the same height position as that of the vehicle gravity center 6. Then, in a base portion 100 on the floor surface, the pole 10 is suitably adjusted in terms of its height, arrangement in the back-and-forth direction or width direction of the vehicle 1, and the connection direction relative to the vehicle restraint jig 12.

As above, after restraining the vehicle 1, various tests of the vehicle 1 are conducted by rotating the rollers 7 of the chassis dynamometer.

As explained above, according to the vehicle restraint device 11 of the present embodiment, one end side of the vehicle restraint jig 12 is rotatably connected on the outer surface 2b of the seatbelt fixing pillar 2 by the first link mechanism 51, and in contrast the other end side of the vehicle restraint jig 12 is rotatably connected at the pole 10 by the second link mechanism 17.

Therefore, it results in achieving advantageous effects similar to those of the vehicle restraint device 11 of the fourth embodiment. That is, it is possible to surely and strongly restrain the vehicle 1. Furthermore, the vehicle (translational) back-and-forth movement is restrained, but the vehicle (rotational) pitching movement and the vehicle (translational) vertical movement become free. With this, it is possible to achieve the vehicle behavior of which vertical load is analogous to that on a road.

In particular, in case that the test vehicle is a vehicle 1 having rear seat doors 121, it suffices that the rear seat doors 121 are removed, the first link mechanisms 71 are attached to the outer surfaces 2b of the left and right seatbelt fixing pillars 2 of the vehicle 1, and one end sides of the vehicle restraint jigs 12 are connected to these first link mechanisms 71. According to this mode, when testing the vehicle 1, it becomes possible to freely rearwardly adjust the driver's seat and/or the front passenger's seat. With this, it becomes possible to freely secure the distance between the steering wheel and the driver's seat. Therefore, in the case of securing the distance between the steering wheel and the driver's seat due to the driver's body type, the measuring instrument installation, etc., it is possible to freely change the driver seat position, without affecting the test driving of the vehicle 1.

Furthermore, it is possible in the pillar attachment member 72a to adjust the connecting shaft 73 in the vehicle height direction of the vehicle 1. Therefore, it is possible to freely set the arrangement of the connecting shaft 73 until the height in the vicinity of the vehicle gravity center 6 in accordance with the size of the vehicle 1.

Figure 17:
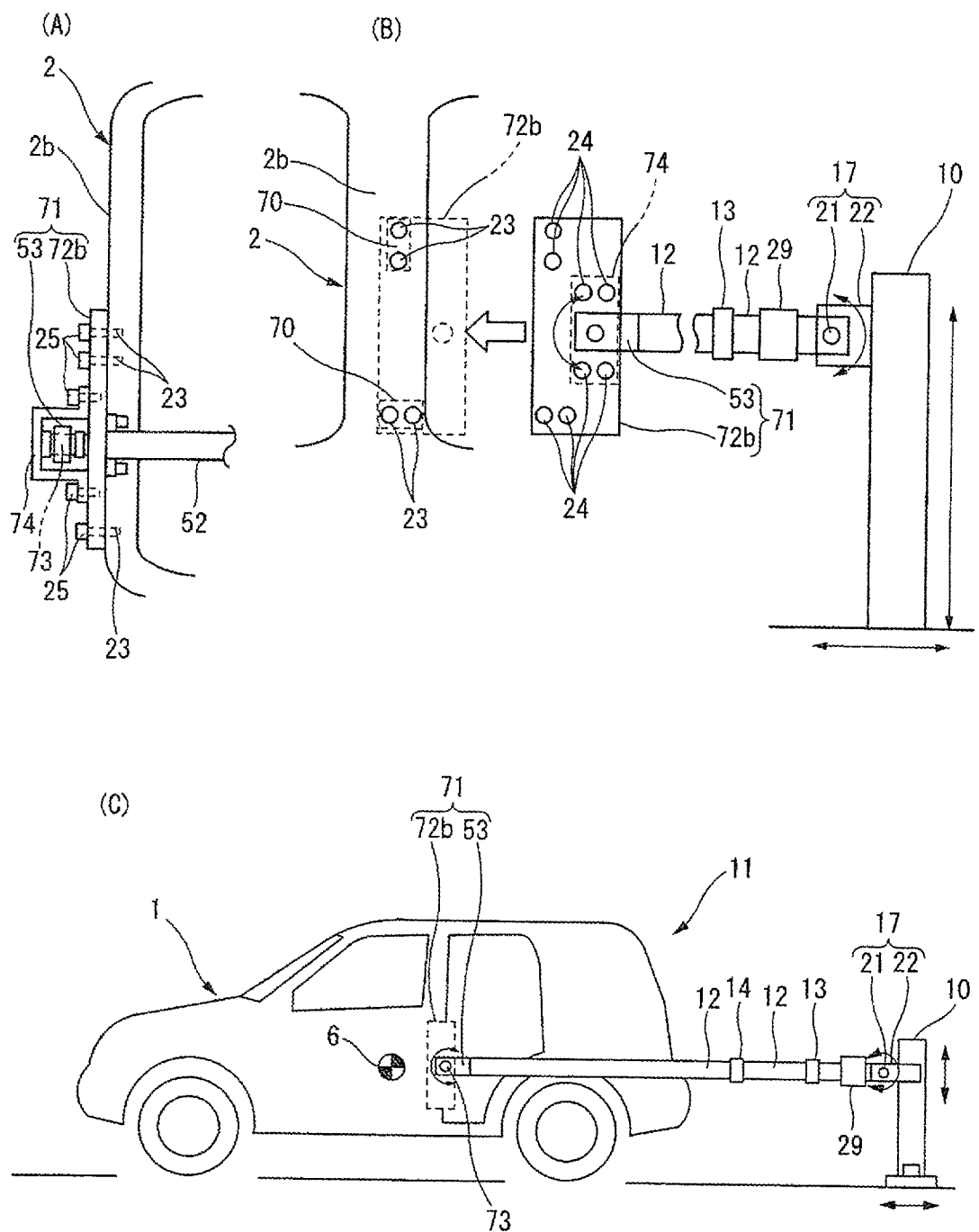
FIGS. 17(A), 17(B) and 17(C) are explanatory views showing one example of a method for attaching the vehicle restraint device to the seatbelt fixing pillar in the eighth embodiment.
Figure 18:
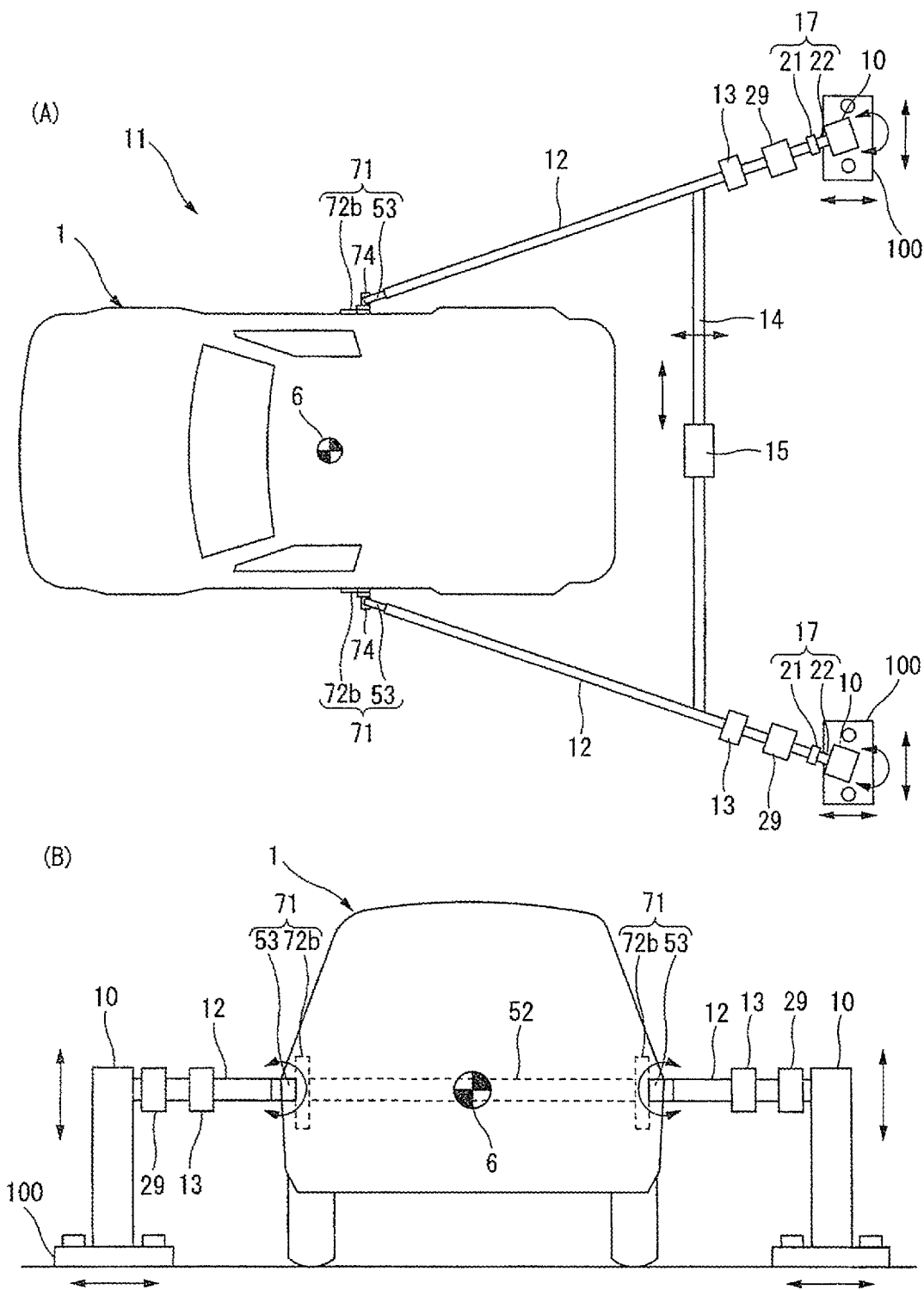
FIG. 18(A) is a schematic plan view of a vehicle restraint device of the eighth embodiment of the present invention, in which a test vehicle is used.
FIG. 18(B) is a schematic rear view of the device.

In the present embodiment, as shown in FIGS. 17, 18, it is optional to install pillar attachment members 72b, in place of the pillar attachment members 72a.

The pillar attachment member 72b is formed to be wider than the pillar attachment member 72a. As shown in FIG. 17(B), this pillar attachment member 72b is attached to the outer surface 2b of the pillar 2 in a condition that its long side end portion on one end side projects to a backward position (the wheel base direction) in the vicinity of the seatbelt fixing pillar 2.

The connecting jig 53 for omnidirectionally rotatably connecting the vehicle restraint jig 12 in outer backward directions is rotatably attached in advance to the connecting shaft 73 that is projectingly fixed by the pressing member 74 to the outer surface of the pillar attachment member 72b in the backward position in the vicinity of the seatbelt fixing pillar 2. The arrangement of the connecting shaft 73 of the present mode is also adjustable in the vehicle height direction.

The pillar attachment members 72b as a pair that are opposed to each other in the vehicle 1 through the left and right seatbelt fixing pillars 2 are connectingly reinforced with a reinforcing jig 52 that is arranged to be coaxial with the connecting shaft 73 and is adjustable in length. The arrangement of the reinforcing jig 52 of the present mode is also adjustable in the vehicle height direction. The reinforcing jig 52 may be connected to the connecting shaft 73.

As above, in the embodiment of FIGS. 17, 18, the width of the pillar attachment member 72b is made wide in the vehicle wheel base direction (offset in the wheel base direction), and the vehicle restraint jig 12 is omnidirectionally rotatably attached in outer backward directions of the vehicle 1 onto the outer surface of the pillar attachment member 72b in a backward position in the vicinity of the seatbelt fixing pillar 2.

Therefore, similar to the embodiment of FIGS. 15, 16, in the embodiment of FIGS. 17, 18 too, when testing the vehicle 1, it becomes possible to freely backwardly adjust the driver's seat and/or the front passenger's seat, and it becomes possible to freely secure the distance between the steering wheel and the driver's seat.

In particular, the pillar attachment members 72b as a pair that are opposed to each other through the vehicle 1 are connectingly reinforced with the reinforcing jig 52 that are adjustable in length. Therefore, it is possible to improve the pillar attachment members 72b in rigidity. Furthermore, the reinforcing jig 52 and the connecting shafts 73 are adjustable in the vehicle height direction of the vehicle 1 in the pillar attachment members 72b. Therefore, it is possible to freely set the arrangement of the reinforcing jig 52 and the connecting shafts 73 until the height in the vicinity of the vehicle gravity center 6 in accordance with the size of the vehicle 1.

Figure 19:
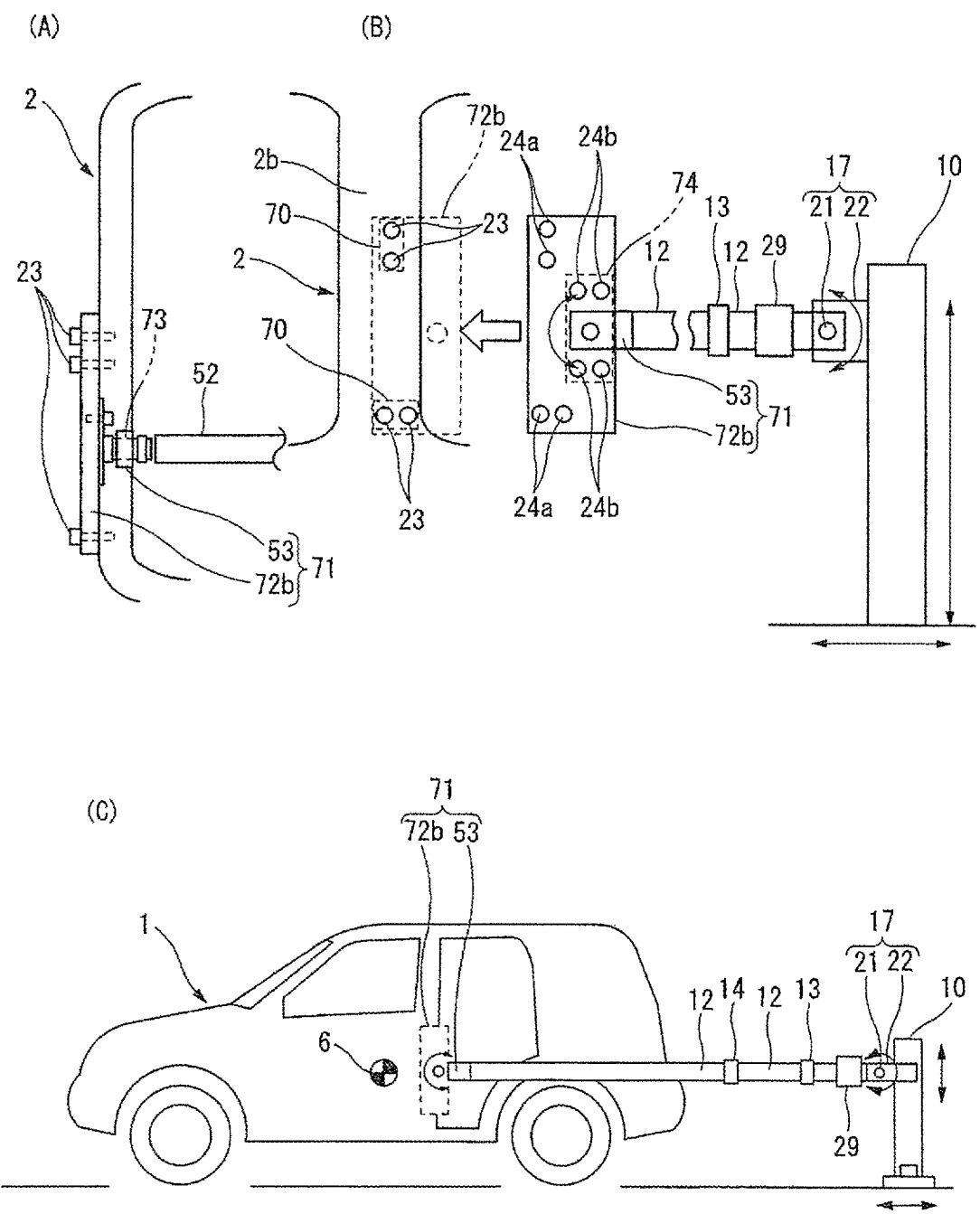
FIGS. 19(A), 19(B) and 19(C) are explanatory views showing one example of a method for attaching the vehicle restraint device to the seatbelt fixing pillar in the eighth embodiment.
Figure 20:
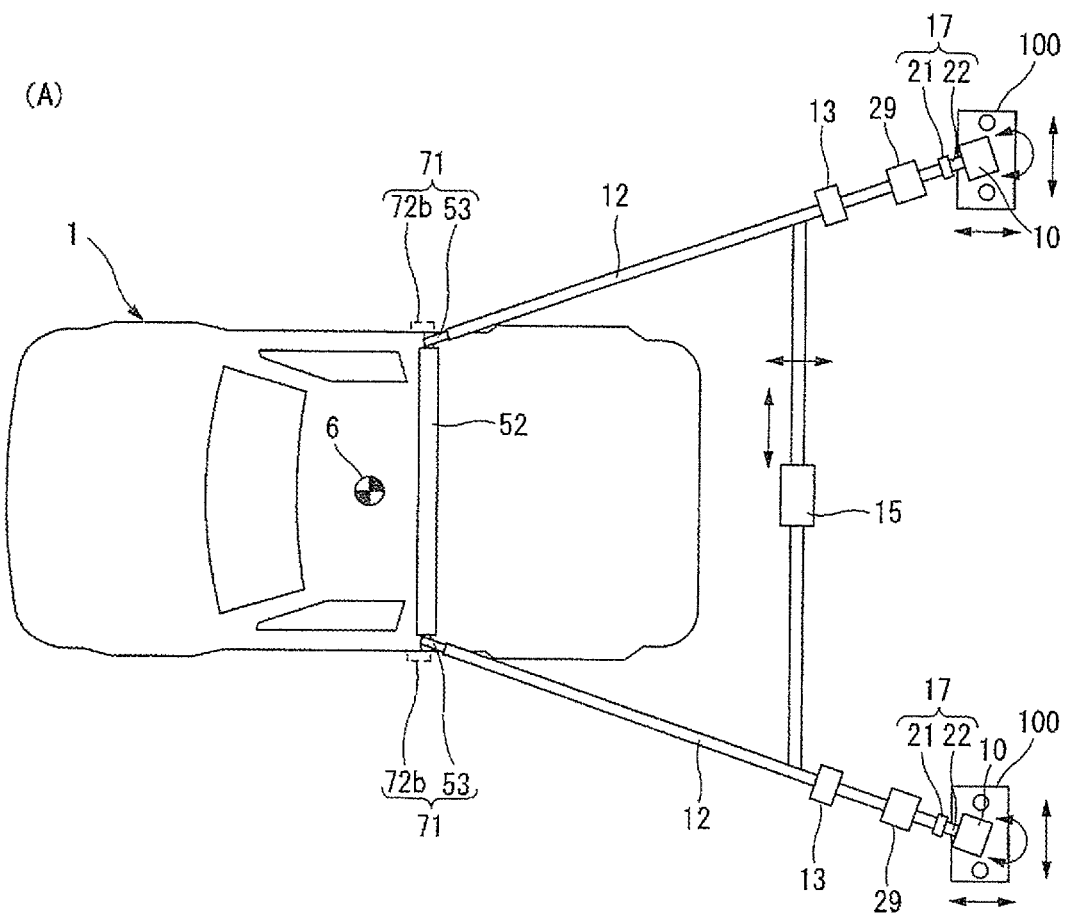
FIG. 20(A) is a schematic plan view of a vehicle restraint device of the eighth embodiment of the present invention, in which a test vehicle is used.
FIG. 20(B) is a schematic rear view of the device.
Figure 20:
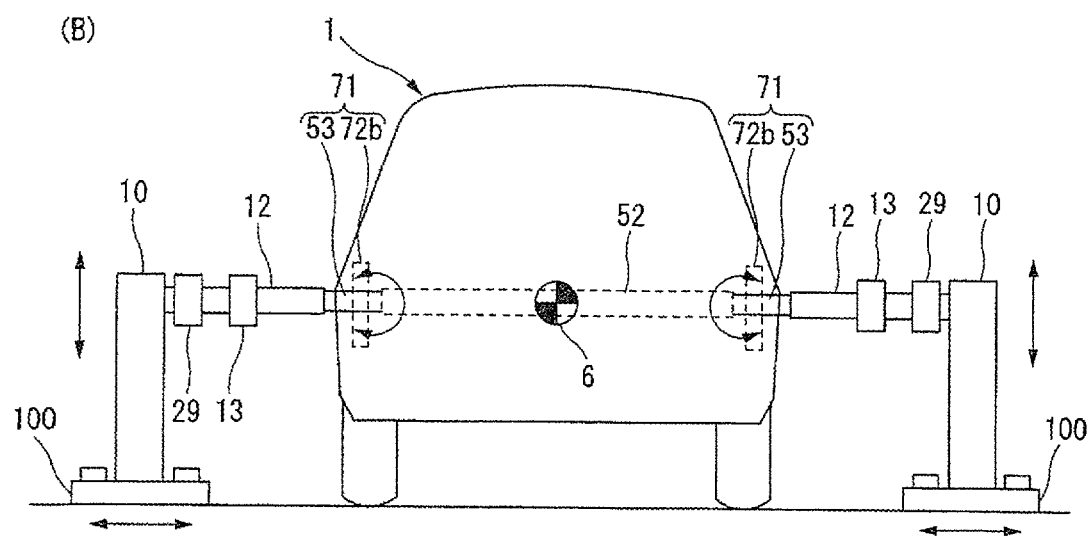

Furthermore, in the present embodiment, as shown in FIGS. 19, 20, the connecting shaft 73, to which the connecting jig 53 is rotatably attached, may be projectingly formed on an inner surface of the pillar attachment member 72b. The arrangement of the connecting shaft 73 of the present mode is adjustable in the vehicle height direction.

The connecting shaft 73 is projectingly formed and fixed on the inner surface of the pillar attachment member 72b corresponding to a backward position in the vicinity of the seatbelt fixing pillar 2 and is connected to the reinforcing jig 52 that connects and reinforces the pillar attachment members 72b as a pair that are opposed to each other in the vehicle 1.

It is clear that advantageous effects similar to those of the embodiment of FIGS. 17, 18 can be obtained in the present embodiment, too. In particular, in the present embodiment, the pressing member 74 pressing the connecting shaft 73 becomes unnecessary. Therefore, the number of parts of the first link mechanism 71 decreases, and the assembly operation of the vehicle restraint device 11 to the vehicle 1 is simplified.

Figure 21:
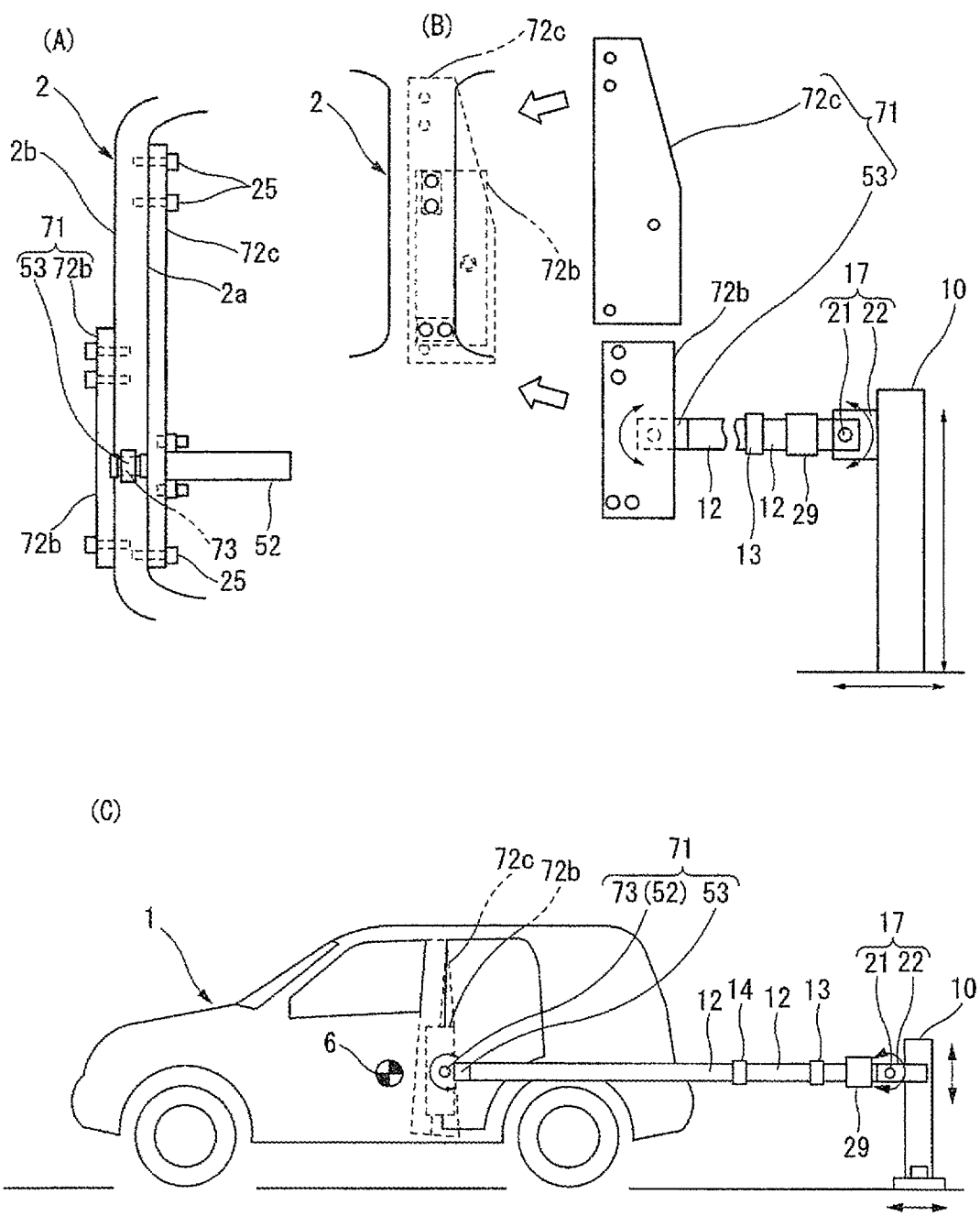
FIGS. 21(A), 21(B) and 21(C) are explanatory views showing one example of a method for attaching the vehicle restraint device to the seatbelt fixing pillar in the eighth embodiment.
Figure 22:
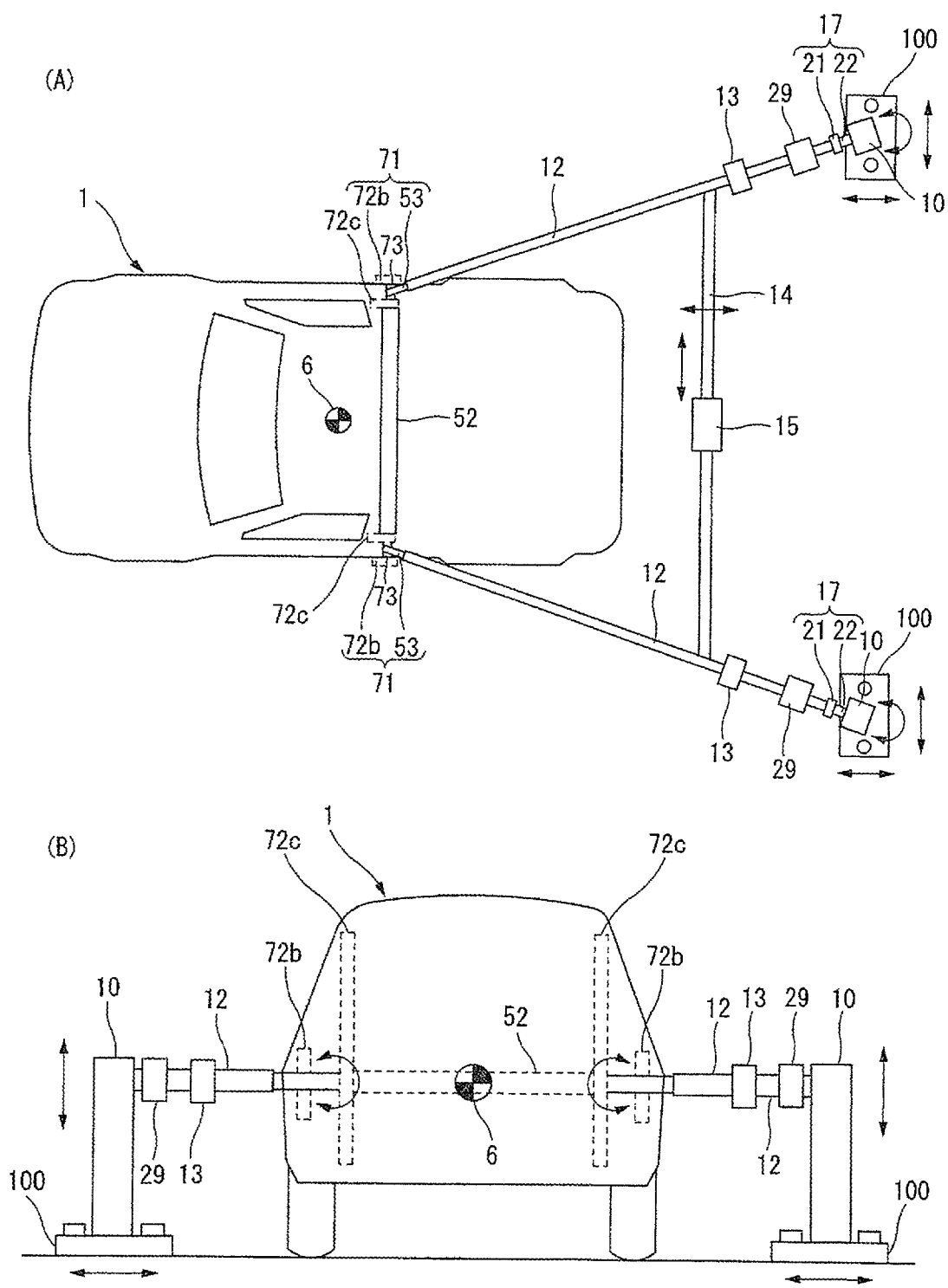
FIG. 22(A) is a schematic plan view of a vehicle restraint device of the eighth embodiment of the present invention, in which a test vehicle is used.
FIG. 22(B) is a schematic rear view of the device.

Furthermore, in the present embodiment, as shown in FIGS. 21, 22, a pillar attachment member 72c that is wider and longer in total length than the pillar attachment member 72b may be interposed between the connecting shaft 73 and the reinforcing jig 52.

The pillar attachment members 72c are attached to the inner surfaces 2a of the left and right seatbelt fixing pillars 2 in the vehicle 1 by the screws 25 in a condition that the connecting shaft 73, to which the connecting jig 53 has been rotatably attached, is interposed between the pillar attachment member 72c and the pillar attachment member 72b. A pair of the pillar attachment members 72c that are attached to the inner surfaces 2a of the left and right seatbelt fixing pillars 2 are connectingly reinforced with the reinforcing jig 52 that is arranged to be coaxial with the connecting shaft 73 and is adjustable in length. This reinforcing jig 52 may also be connected with the connecting shaft(s) 73. The arrangements of the reinforcing jig 52 and the connecting shaft(s) 73 are adjustable in the vehicle height direction.

In the present embodiment too, it is clear that advantageous effects similar to the embodiment of FIGS. 17,18 can be obtained. In particular, in the present embodiment, as shown in FIG. 21 and FIG. 22, the connecting shaft 73, to which the connecting jig 53 has been rotatably attached, is interposed between the pillar attachment member 72b that is attached to outer surface 2b of the seatbelt fixing pillar 2 of the vehicle and the pillar attachment member 72c that is attached to the inner surface 2a of the seatbelt fixing pillar 2, and the pillar attachment members 72c opposed to each other in the vehicle 1 are connectingly reinforced with the reinforcing jig 52 that is adjustable in length. With this, the first link mechanisms 71 for connecting the vehicle restraint jigs 12 are improved in rigidity.

Ninth Embodiment

FIGS. 23-26 show the ninth embodiment. The present embodiment is equipped in the mode of the fourth to seventh embodiments, with a pair of vehicle restraint jigs 82, which are shorter than a pair of vehicle restraint jigs 12, in place of the pair of vehicle restraint jigs 12, and with vehicle exterior fixing devices 83 in place of the poles 10.

Figure 23:
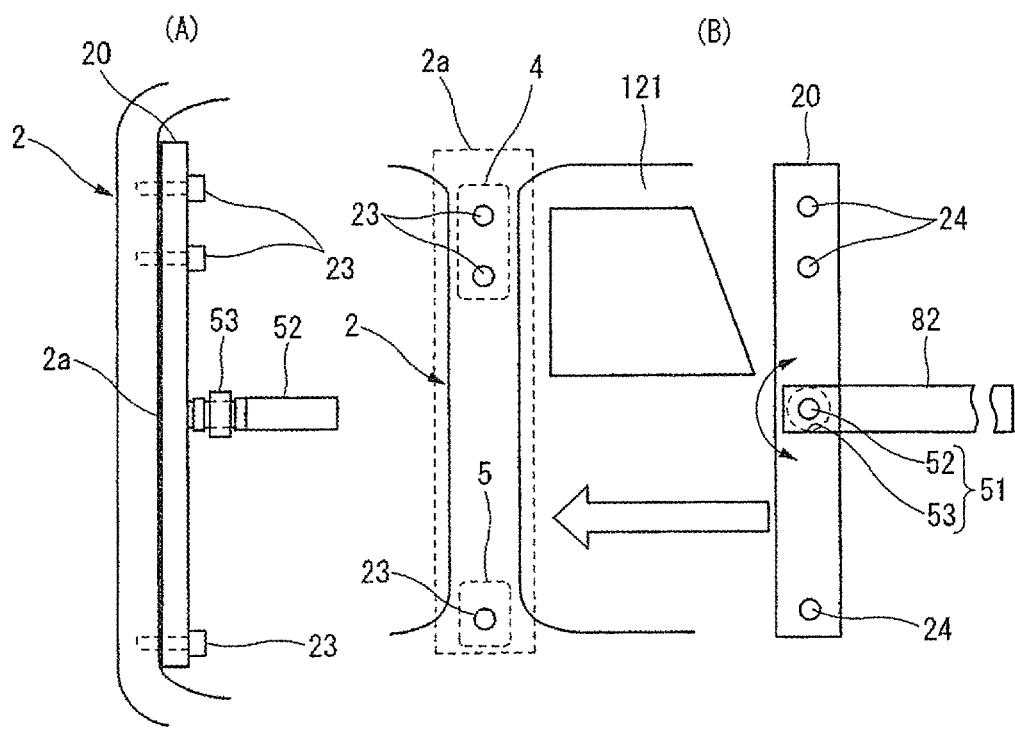
FIGS. 23(A) and 23(B) are explanatory views showing one example of a method for attaching the vehicle restraint device to the seatbelt fixing pillar in the ninth embodiment.
Figure 24:
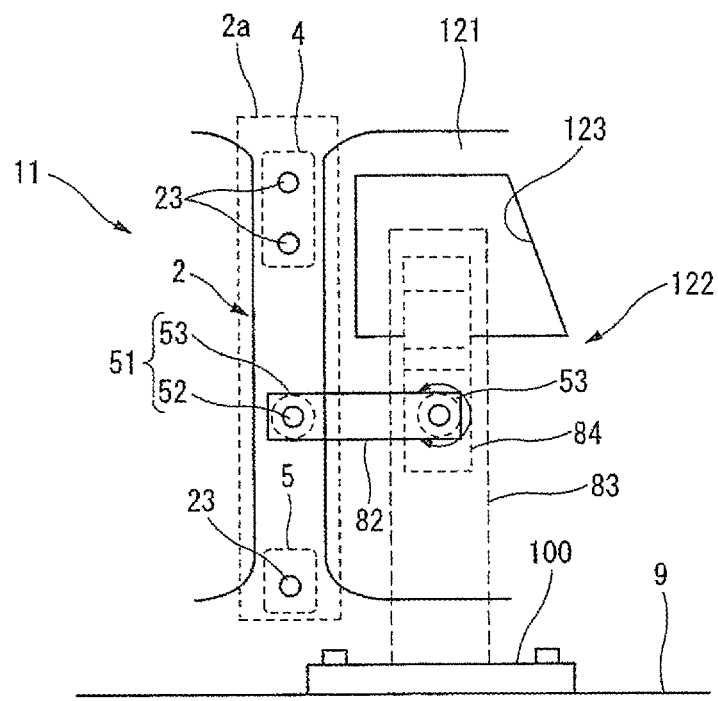
FIG. 24(A) is an explanatory view of a condition where a vehicle restraint jig is attached to the seatbelt fixing pillar in the ninth embodiment.
FIG. 24(B) is a schematic side view of a vehicle restraint device of the same embodiment of the present invention, in which a test vehicle is used.
Figure 24:
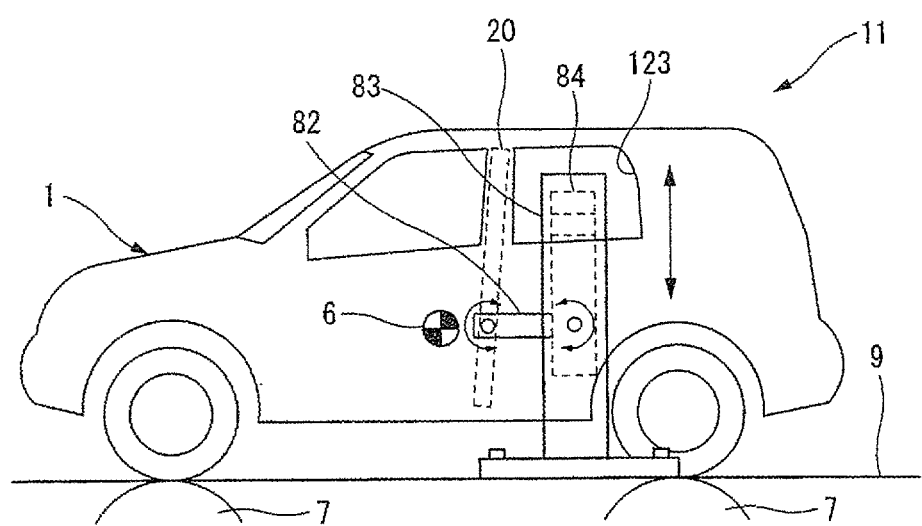

As shown in FIGS. 23, 24, the vehicle restraint jigs 82 as a pair are each connected at their one end sides to the first link mechanism 51 in the pillar attachment members 20 attached to the inner surfaces 2a of the left and right seatbelt fixing pillars 2 of the vehicle 1 having rear seat doors 121, and are connected at the other end sides to a link mechanism 84 that is provided in a rear seat room 122 of the vehicle 1.

The arrangement of the reinforcing jig 52 of the first link mechanism 51 is adjustable in the vehicle height direction in the pillar attachment members 20. The explanations of the first link mechanism 51 and structure and function of the connecting jigs 53 as its element conform to the first link mechanism 51 and structure and function of the connecting jigs 53 of the fourth embodiment with reference to FIG. 4.

The vehicle exterior fixing devices 83 as a pair are installed on the floor surface 9 in the vicinities of the left and right rear seat doors 121 of the vehicle and support a link mechanism 84 through opening portions 123 of the rear seat doors 121.

Figure 25:
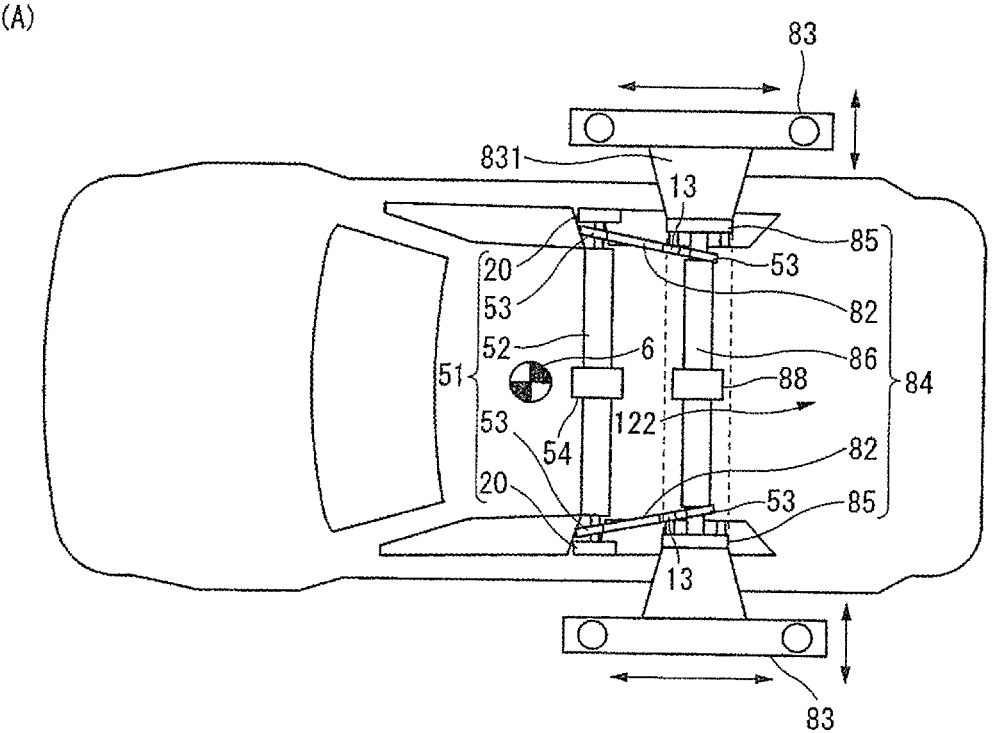
FIG. 25(A) is a schematic plan view of a vehicle restraint device of the ninth embodiment of the present invention, in which a test vehicle is used.
FIG. 25(B) is a schematic rear view of the device.
Figure 25:
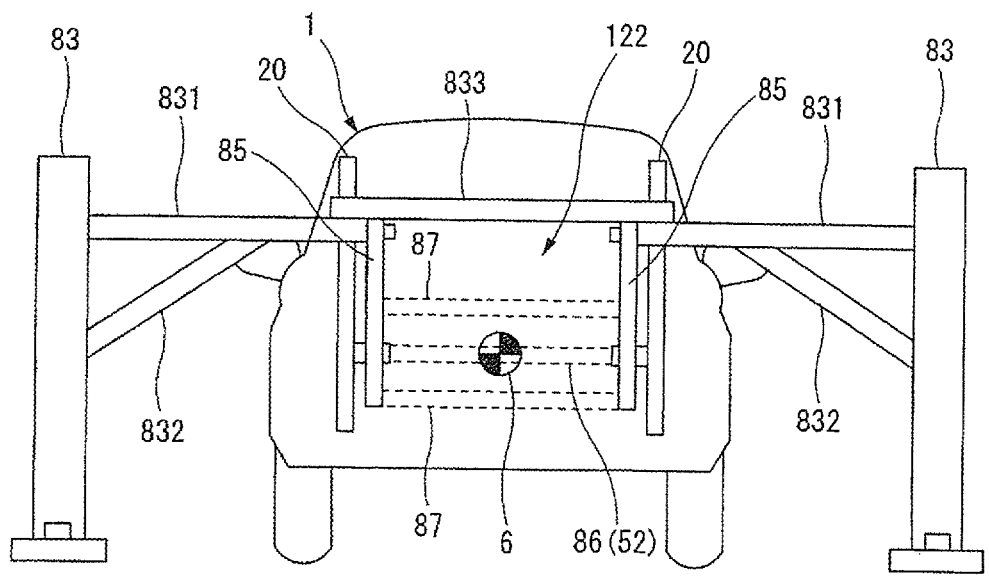

As shown in FIG. 25, the link mechanism 84 is equipped with a pair of left and right attachment members 85 that are vertically and opposingly arranged in the rear seat room 122 of the vehicle 1 on the side of the rear seat doors 121, a first reinforcing jig 86 that connects and reinforces this pair of the attachment members 85 and is adjustable in length, and a pair of connecting jigs 53 that rotatably connect the other ends of the vehicle restraint jigs 82 to around both ends of this first reinforcing jig 86.

The first reinforcing jig 86 is attached in a manner that its arrangement relative to a pair of the attachment members 85 opposed to each other in the vehicle 1 is adjustable in the vehicle height direction of the vehicle 1. The pillow ball 55 (FIG. 10) of the connecting jig 53 is mounted and fixed in advance at around one end of the first reinforcing jig 86. On the other hand, the attachment members 85 as a pair opposed to each other are further supplementally connected by and reinforced with second reinforcing jigs 87 that are adjustable in length.

The vehicle fixing devices 83 are equipped with a pair of supporting members 831 that vertically arranges and supports a pair of attachment members 85 of the link mechanism 84 in the vehicle 1. This pair of supporting members 831 is horizontally supported by horizontally supporting members 832 possessed by main bodies of the vehicle exterior fixing devices 83 and is stably connectingly reinforced by a connecting reinforcing member 833 possessed in the rear seat room 122 of the vehicle 1. Similar to the pole 10 of the first to the eighth embodiments, the vehicle exterior fixing device 833 is installed on the floor surface 9 such that its position is adjustable in any one direction of vehicle width direction, vehicle length direction and vehicle height direction.

With reference to FIGS. 23-25, an exemplary use of the vehicle restraint device 11 of the present embodiment is explained.

Firstly, the pillar attachment member 20 where one end of the vehicle restraint jig 82 has been connected to the connecting jig 53 of the first link mechanism 51 is attached to the inner surface 2a of the seatbelt fixing pillar 2. With this, in the vicinity of the vehicle gravity center 6, the vehicle restraint jig 82 becomes rotatable in a rearward omnidirection in the vehicle 1. Next, the other end side of the vehicle restraint jig 82 is connected to the connecting jig 53 of the link mechanism 84 supported in the rear seat room 122 at generally the same height position as that of the vehicle gravity center 6. Then, the vehicle restraint jigs 82, 82 are adjusted in length by the length adjusting mechanisms 13. Furthermore, the position of the vehicle exterior fixing device 83 is adjusted in any one direction of vehicle width direction, vehicle length direction and vehicle height direction. As above, after restraining the vehicle 1, various tests of the vehicle 1 are conducted by rotating the rollers 7 of the chassis dynamometer.

According to the above vehicle restraint device 11 of the present embodiment, similar to the vehicle restraint device 11 of the sixth embodiment, it is possible to surely and strongly restrain the vehicle 1. The vehicle (translational) back-and-forth movement is restrained, but the vehicle (rotational) pitching movement and the vehicle (translational) vertical movement become free. With this, it is possible to achieve the vehicle behavior of which vertical load is analogous to that on a road.

In particular, in the present embodiment, in addition to the advantageous effects of the sixth embodiment, in case that the test vehicle is a vehicle 1 having rear seat doors 121, the link mechanism 84 to which the other end of the vehicle restraint jig 82 has been connected is supported by the vehicle exterior fixing device 83 through the opening portion 123 of the rear seat door 121. Therefore, it is possible to reduce modification of the vehicle 1 to be used in the vehicle test.

The reinforcing jig 52 and the first reinforcing jig 86 are respectively attachable to the pillar attachment member 20 and the attachment member 85 in a manner to be adjustable in the vehicle height direction of the vehicle 1. Therefore, it is possible to freely set the arrangements of the reinforcing jig 52 and the first reinforcing jig 86 until the height in the vicinity of the vehicle gravity center 6 in accordance with the size of the vehicle 1.

Furthermore, the other ends of the vehicle restraint jigs 82 are connected to around both ends of this first reinforcing jig 86 through the connecting jigs 53. Therefore, load factor of moment (torque) of the vehicle restraint jigs 82 relative to the first reinforcing jig 86 is reduced. With this, it is possible to prevent deformation of the first reinforcing jig 86 and the subsequent deformation or breaking of the attachment members 85.

Between this pair of attachment members 85 is further supplementally connectingly reinforced with a second reinforcing jig 87 that is adjustable in length. While the attachment members 85 are reinforced, it is possible to further stably support the first reinforcing jig 86.

Figure 26:
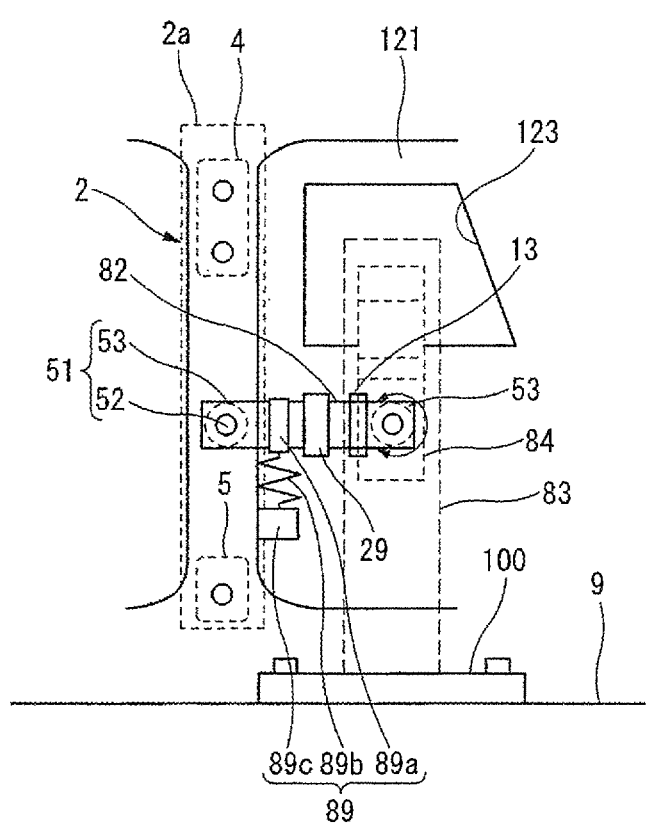
FIG. 26 is an explanatory view of a condition where a vehicle restraint jig is attached to the seatbelt fixing pillar in the ninth embodiment.

Furthermore, as shown in FIG. 26, similar to the fifth embodiment, it is beneficial that the vehicle restraint jig 82 is equipped with the restraint strength detector 29. According to this mode, it is possible to detect the restraint strength of the vehicle 1. Therefore, it is possible to detect the measurement signals of the restraint strength in the back-and-force direction of the vehicle 1.

Furthermore, as shown in the same drawing, it is beneficial that the vehicle restraint jig 82 is equipped with a vibration damping device 89 for damping natural vibration of this jig 82. As the vibration damping device 89, there is cited a known vibration damping device that is eccentrically or non-coaxially attached to the vehicle restraint jigs 12, 82.

The vibration damping device 89 is equipped with an attachment member 89a that is detachably attached to the vehicle restraint jig 82, an elastic member 89b, such as rubber and spring, that is detachably attached to this member 89a, and a weight 89c that is detachably attached to this member 89b and is adjustable in weight.

According to the embodiment of the same drawing, natural vibration of the vehicle restraint jig 82 occurring at the test of the vehicle 1 is damped. Therefore, the restraint strength detector 29 can detect the measurement signals of the restraint strength in which the effect of the vehicle restraint jig 82 has been reduced.

Tenth Embodiment

Figure 27:
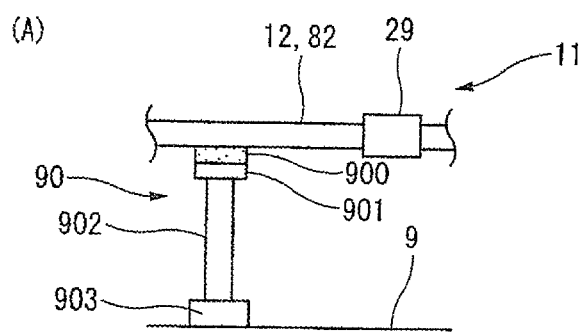
FIG. 27(A) is a schematic side view of a deflection absorbing mechanism in the tenth embodiment.
FIG. 27(B) is a longitudinal sectional view of the same mechanism.
Figure 27:
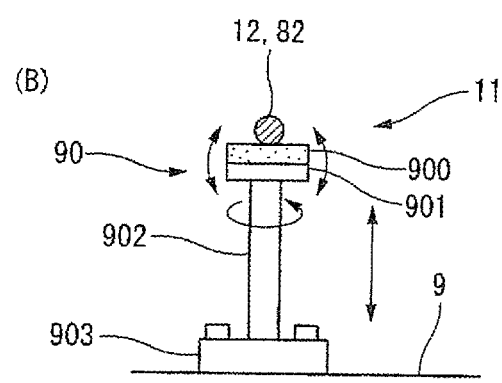
Figure 28:
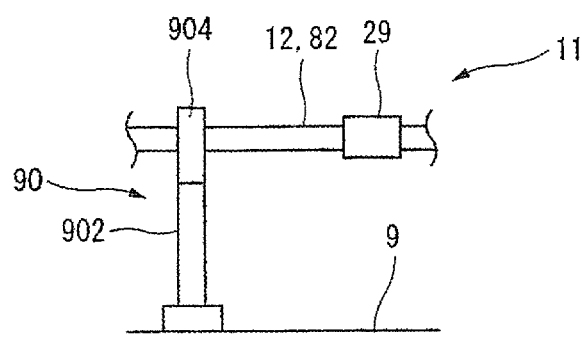
FIG. 28(A) is a schematic side view of a deflection absorbing mechanism in the tenth embodiment.
FIG. 28(B) is a longitudinal sectional view of the same mechanism.
Figure 28:
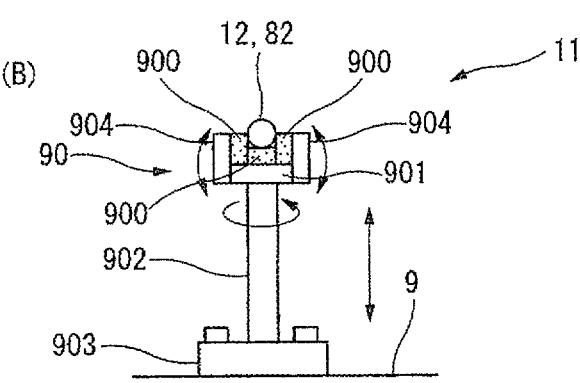

FIG. 27 and FIG. 28 show the tenth embodiment. The vehicle restraint device 11 of the present embodiment is equipped with a deflection absorbing mechanism 90 that absorbs deflection of the vehicle restraint jigs 12, 82 occurring at the test of the vehicle 1 by the chassis dynamometer in the first to ninth embodiments.

The deflection absorbing mechanism 90 shown in FIG. 27 is equipped with a jig receiving portion 901 having a buffer material 900 that is brought into an elastic abutment with the vehicle restraint jig generating deflection in the gravity direction at the test, and a support portion 902 that supports this jig receiving portion 901 to be rotatable in a horizontal direction or a vertical direction. As the buffer material 900, a thick plate, etc. made of a known elastic member such as polyethylene is applied.

The support portion 902 is vertically mounted on a base portion 903 installed on the floor surface 9 in a manner that its position is adjustable in any of vehicle width direction, vehicle length direction and vehicle height direction of the vehicle 1.

According to the present embodiment above, in addition to the advantageous effects of the first to ninth embodiments, as a result of arranging the deflection absorbing mechanism 90, the buffer material 900 can absorb the impact of the restraint jigs 12, 82 that deflect in the gravity direction at the test of of the vehicle 1 by chassis dynamometer.

For example, even if the vehicle restraint jigs 12, 82 deflect as a result of a rapid deceleration of the vehicle 1 by a brake operation test, etc., this deflection is absorbed by the buffer material 900 on the jig receiving portion 901. Therefore, it is possible to reduce the effect of the restraint strength of the restraint strength detector 29 on the measurement signals. Furthermore, it is possible to prevent braking caused by buckling of the vehicle restraint jigs 12, 82.

In particular, the jig receiving portion 901 is arranged below the vehicle restraint jigs 12, 82 (in the gravity direction) and is rotatable in horizontal direction or vertical direction. Therefore, it is possible to respond to deflection of the vehicle restraint jigs 12, 82 in any directions and to absorb this deflection.

Furthermore, as shown in FIG. 28, it is beneficial that the jig receiving portion 901 is equipped with a pair of receiving portions 904 having buffer materials 900 that are brought into an elastic abutment with the vehicle restraint jig having deflection in horizontal direction. According to the present mode, impact of the vehicle restraint jig 12, 82 to deflect in gravity direction and in vehicle width direction is surely absorbed by the buffer materials 900. Therefore, it becomes possible to detect the measurement signals of the restraint strength with a further reduced effect of the vehicle restraint jig 12, 82. Furthermore, it is possible to more effectively prevent breaking of the vehicle restraint jig 12, 82 by buckling phenomena.

Figure 29:
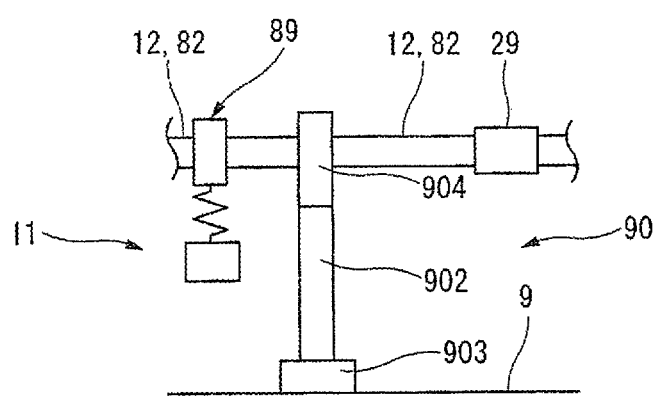
FIG. 29 is an explanatory view of a condition where a deflection absorbing mechanism and a vibration damping device are attached to a vehicle restraint jig in the tenth embodiment.

As shown in FIG. 29, even in the present embodiment, similar to the ninth embodiment, it is beneficial to detachably attach the vibration damping device 89 to the vehicle restraint jig 12, 82. According to this mode, natural vibration of the vehicle restraint jig 82 occurring at the test of the vehicle 1 is damped. Therefore, the restraint strength detector 29 can detect the measurement signals of the restraint strength in which the effect of the vehicle restraint jig 82 generated at the test of the vehicle 1 has been reduced.

Eleventh Embodiment

Figure 30:
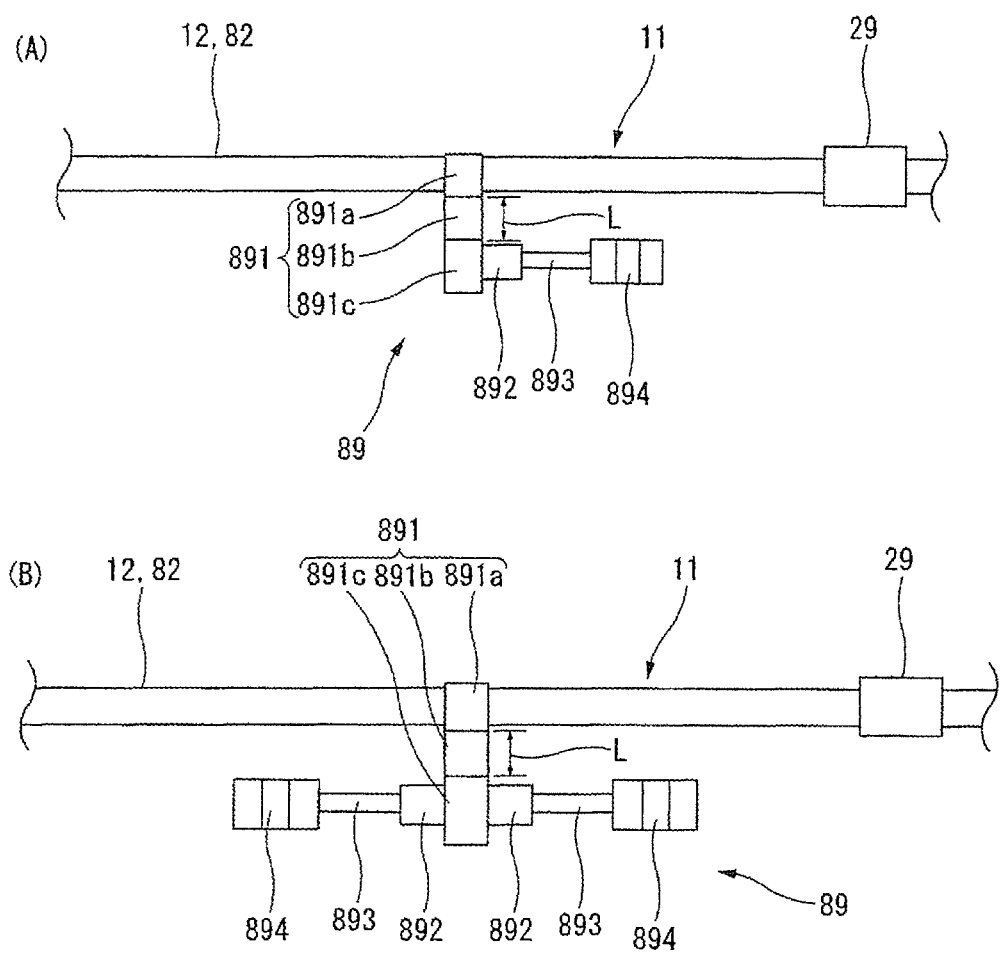
FIGS. 30(A) and 30(B) are schematic side views of vibration damping devices in the eleventh embodiment.

FIG. 30 shows the eleventh embodiment. The vehicle restraint device 11 of the present embodiment is equipped with a vibration damping device 89 for damping natural vibration of the vehicle restraint jig 12, 82 occurring at the test of the vehicle 1 by chassis dynamometer.

As shown in FIG. 30, as the vibration damping device 89, there is cited a vibration damping device that is eccentrically or non-coaxially attached to the vehicle restraint jig 12, 82.

The vibration damping device 89 shown in FIG. 30(A) is equipped with an attachment member 891 that is detachably attached to the vehicle restraint jig 12, 82, an elastic member 892 that is detachably attached to an outer surface of a lower end portion 891c of this attachment member 891, a shaft portion that is detachably attached at its one end to this elastic member 892 and is adjustable in length, and a weight portion 894 that is detachably attached to the other end of this shaft portion 893 and is adjustable in weight.

The attachment member 891 is equipped with an upper end portion 891a that is detachably attached to the vehicle restraint jig 12, 82, a main body portion 891b that is detachably attached to this upper end portion 891a, and the lower end portion 891c that is detachably attached to this main body portion 891b.

The main body portion 891b is omnidirectionally rotatable about the upper end portion 891a (the position of attachment to the vehicle restraint jig 12, 82). To be omnidirectionally rotatable, as the upper end portion 891a, for example, one equipped at its upper end with a pillow ball is applied.

The main body portion 891b is detachable from the upper end portion 891a. Therefore, it suffices to freely make a selection from main body portions 891b having different lengths. If the main body portion 891b is equipped with a length adjusting mechanism, it becomes unnecessary to replace the main body portion 891b.

The lower end portion 891c is rotatable in horizontal direction. For example, if one formed with a female screw portion that is brought into a threaded engagement with the lower end of the main body portion 891b is applied as the lower end portion 891c, it becomes freely rotatable in horizontal direction.

As the elastic member 892, for example, an elastic member, such as elastic rubber and coil spring, that is applied to a known vibration isolating damper is used. As the shaft portion 893, for example, a screw shaft that is threadedly engaged with the elastic member 892 and is adjustable in length is applied. As the weight portion 894, for example, a separable weight of a known shape that is threadedly engaged with the shaft portion 893 is suitably applied.

According to the present embodiment above, due to arranging the vibration damping device 89, in addition to the advantageous effects of the first to tenth embodiments, natural vibration of the vehicle restraint jig 12, 82 occurring at the test of the vehicle 1 is damped. Therefore, the restraint strength detector 29 can detect the measurement signals of the restraint strength in which the effect of the vehicle restraint jig 12, 82 has been reduced.

For example, even in case that the vehicle 1 used in the vehicle test has been rapidly accelerated or decelerated, damping factor of natural vibration of the vehicle restraint jig 12, 82 is reduced by the vibration damping device 89 to shorten the amplitude time of the vehicle restraint jig 12, 82. Therefore, it is possible to suppress the effect of the restraint strength detector 29 on the measurement signals.

By the way, as a conventional vibration damping device for damping natural vibration of a rod-shaped member, vibration damping devices disclosed in Patent Publications 4 to 7 are known. However, these vibration damping devices are those for damping natural vibration of a rod-shaped member of which one end is a free end and have a structure to be concentrically or coaxially attached to this rod-shaped member. Therefore, in case that natural vibration of a rod-shaped member, like the vehicle restraint jig 12, 82, of which both ends are fixed, is damped by the vibration damping device of Patent Publications 4 to 7, it becomes difficult to replace the weight in order to adjust the damping factor.

In contrast with this, it is possible to eccentrically or non-coaxially and detachably attach the vibration damping device 89 to be spaced from the vehicle restraint jig 12, 82. Therefore, there becomes possible an easy attachment to a rod-shaped member, like the vehicle restraint jig 12, 82, in which both ends are fixed and thereby the adjustment of natural frequency is difficult. Moreover, even after the attachment, the weight adjustment of the weight 894 becomes possible. Therefore, it becomes easy to adjust natural vibration frequency and damping factor of the vehicle restraint jig 12, 82.

In particular, in the vibration damping device 89, the attachment member 891 is such that the upper end portion 891a is detachable from the vehicle restraint jig 12, 82, that the main body portion 891b is detachable from the upper end portion 891a, that the lower end portion 891c is detachable from the main body portion 891b, that the elastic member 892 is detachable from the lower end portion 891c, that the shaft portion 893 is detachable from the elastic member 892, and that the weight portion 894 is detachable from the shaft portion 893. Therefore, it becomes possible to freely and separately set the attaching position of the upper end portion 891a to the vehicle restraint jig 12, 82, the lengths of the main body portion 891b, the shaft portion 893 and the elastic member 892, elastic force of the elastic member 892, and the weight of the weight 894. Therefore, it becomes possible to conduct a flexible adjustment to the natural vibration frequency of the vehicle restraint jig 12, 82. By making the lower end portion 891c rotatable in horizontal direction, the above adjustment's effect is further improved.

As shown in FIG. 30(B), it is beneficial that an elastic member 892 is detachably and additionally attached to the outer surface of the lower end portion 891c of the attachment member 891 to be opposed to the existing elastic member 892, that a shaft portion 893 adjustable in length is detachably attached to this elastic member 892, and that a weight portion 894 adjustable in weight is detachably attached to this shaft portion 893. According to the present mode, the adjustment range of natural vibration frequency and damping factor of the vehicle restraint jig 12, 82 is further extended.

The vibration damping device 89 explained above aims to damp vibration of the vehicle restraint jig 12, 82. It is, however, not limited to the vehicle restraint jig 12, 82, but the vibration damping device of the present invention can be applied to other rod-shaped members that generate vibration phenomena, thereby damping natural vibration of such other members.

Twelfth Embodiment

Figure 31:
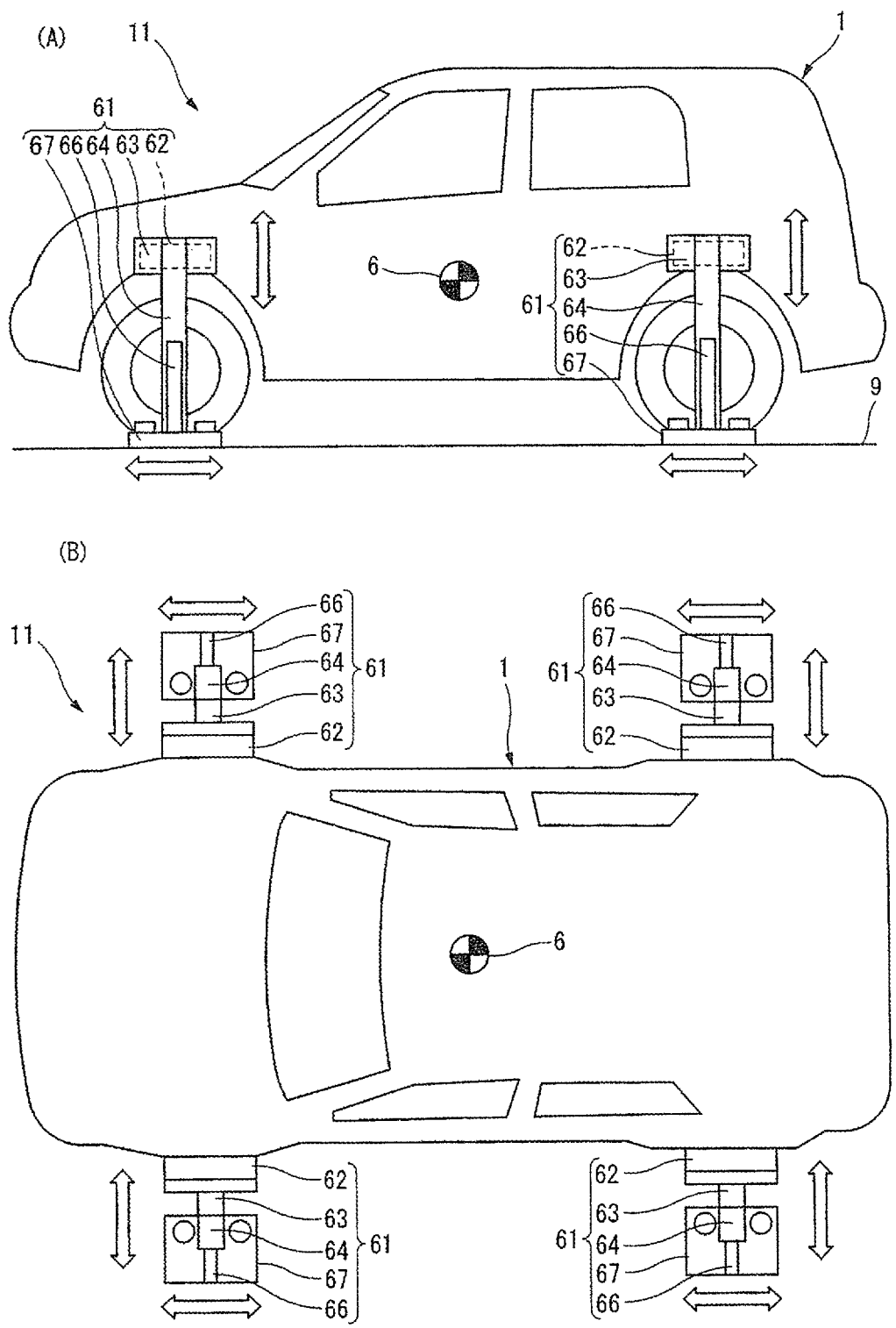
FIG. 31(A) is, in a vehicle restraint device of the twelfth embodiment of the present invention using a test vehicle, a schematic side view of a lateral deviation suppressing mechanism of the same vehicle.
FIG. 31(B) is a schematic plan view of the same suppressing mechanism.
Figure 32:
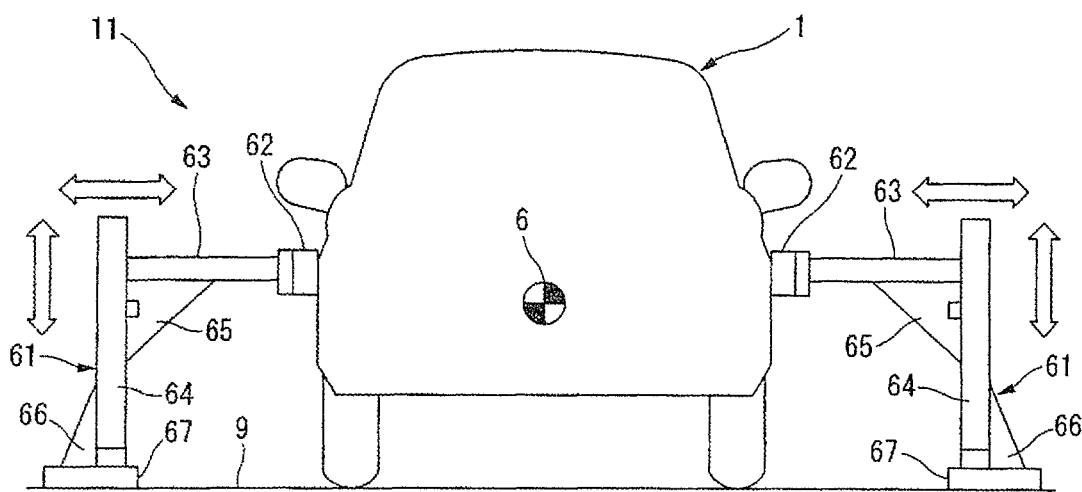
FIG. 32 is a schematic rear view of a lateral deviation suppressing mechanism of the twelfth embodiment.

FIG. 31 and FIG. 32 show the twelfth embodiment. The vehicle restraint device 11 of the present embodiment is further equipped with a lateral deviation suppressing mechanism 61 that suppresses lateral deviation of the vehicle 1 to be generated at the test of the vehicle 1 by chassis dynamometer in any mode of the first to eleventh embodiments.

The lateral deviation suppressing mechanisms 61 are arranged as a pair of left and right ones at the positions on the front wheel sides and as a pair of left and right ones at the positions on the rear wheel sides of the vehicle 1. In particular, in the fourth and fifth embodiments, they are arranged not to interfere with the vehicle restraint jig 12.

The lateral deviation suppressing mechanism 61 is equipped with a buffering material 62 that is brought into an elastic abutment with the body of the vehicle 1, a supporting member 63 that supports the buffering material 62 in a manner that the arrangement of this buffering material 62 is adjustable in the width direction of the vehicle 1, and a support portion 64 that is attached to this supporting member 63.

The buffering material 62 is formed by filling with sponge or air balls. Similar to the vehicle restraint jig 12, the supporting member 63 and the support portion 64 are made of a material having a tensile strength and a compressive strength, which are necessary for restraining lateral force of the vehicle 1, such as plate material and metal tube material, by a material superior in mechanical strength, such as steel plate.

As shown in FIG. 32, the supporting member 63 is horizontally supported by a horizontally supporting member 65 fixed to the support portion 64. On the other hand, the support portion 64 is vertically mounted and supported on a base portion 67 that is arranged and fixed on the floor surface 9 by a vertical mount and support member 66 in a manner to be adjustable in position in any of the vehicle width direction, the vehicle length direction and the vehicle height direction of the vehicle 1.

According to the vehicle restraint device 11 of the present embodiment above, the lateral deviation suppressing mechanism 61 is arranged. Thereby, it is possible to suppress lateral deviation (lateral force) of the vehicle 1 occurring at the test of the vehicle 1 by chassis dynamometer. With this, it is possible to suppress movements of the vehicle 1 except pitching and vertical movement.

By the way, as a vehicle restraint device in chassis dynamometer, besides vehicle restraint devices disclosed in Patent Publications 1-3, for example, vehicle fixing devices disclosed in Patent Publications 8, 9 are known. In the vehicle fixing device of Patent Publication 8, fixing mechanisms of a test vehicle are arranged at corresponding positions of four corners of the vehicle. The vehicle fixing device of Patent Publication 9 is equipped with vehicle stopping bars for fixing front and rear sides of a test vehicle, and lateral holding portions for fixing left and right sides of the vehicle.

In the vehicle fixing devices of Patent Publications 8, 9, front, rear, left and right of a test vehicle is generally completely fixed. Therefore, there is a tendency that the vehicle pitching movement is unnecessarily suppressed. Thus, similar to Patent Publications 1-3, there are some cases in which a vehicle behavior analogous to that on a road cannot be reproduced.

In contrast with this, the vehicle restraint device 11 of the present embodiment is equipped with any vehicle restraint jig 12 of the first to eleventh embodiments and the lateral deviation suppressing mechanisms 61. With this, it is possible to suppress a lateral force of the vehicle 1 occurring at the test of the vehicle 1, while securing release of the vehicle pitching movement. With this, it is possible to more effectively achieve the vehicle behavior of which vertical load is analogous to that on a road.

Furthermore, a pair of left and right, lateral deviation suppressing mechanisms 61 is arranged at each of a position on the front wheels side and a position of the rear wheels side of the vehicle 1. With this, it is possible to suppress lateral deviation of the vehicle 1 at positions in the vicinity of the left and right front fender portions and at positions in the vicinity of the left and right rear fender portions of the vehicle 1. Therefore, normally, driving becomes possible without having an interference with a cool fan discharge port of the vehicle 1 for cooling engine that is installed at the front of the vehicle 1. Furthermore, it does not have an interference with the door opening and closing of the vehicle 1 at the time of riding, etc. Therefore, it becomes possible to shorten the preparation time in the case of mounting the measurement equipment on the vehicle 1.

Furthermore, in the lateral deviation suppressing mechanism 61, the buffer material 62 is brought into an elastic abutment with main body of the vehicle 1. Therefore, it is possible to reduce the effect to interfere with the pitching movement of the vehicle 1. Furthermore, the arrangement position of the buffer material 62 is adjustable in the vehicle's width direction by the supporting member 63. Therefore, it is possible to freely set the arrangement of the buffer material 62 in accordance with the vehicle width of the vehicle 1.

It is possible to adjust the arrangement position of the support portion 64 in any of the vehicle length direction and the vehicle height direction. Therefore, it is possible to freely set the arrangement of the buffer material 62 in accordance with vehicle width, vehicle length and vehicle height of the vehicle 1.

Thirteenth Embodiment

Figure 33:
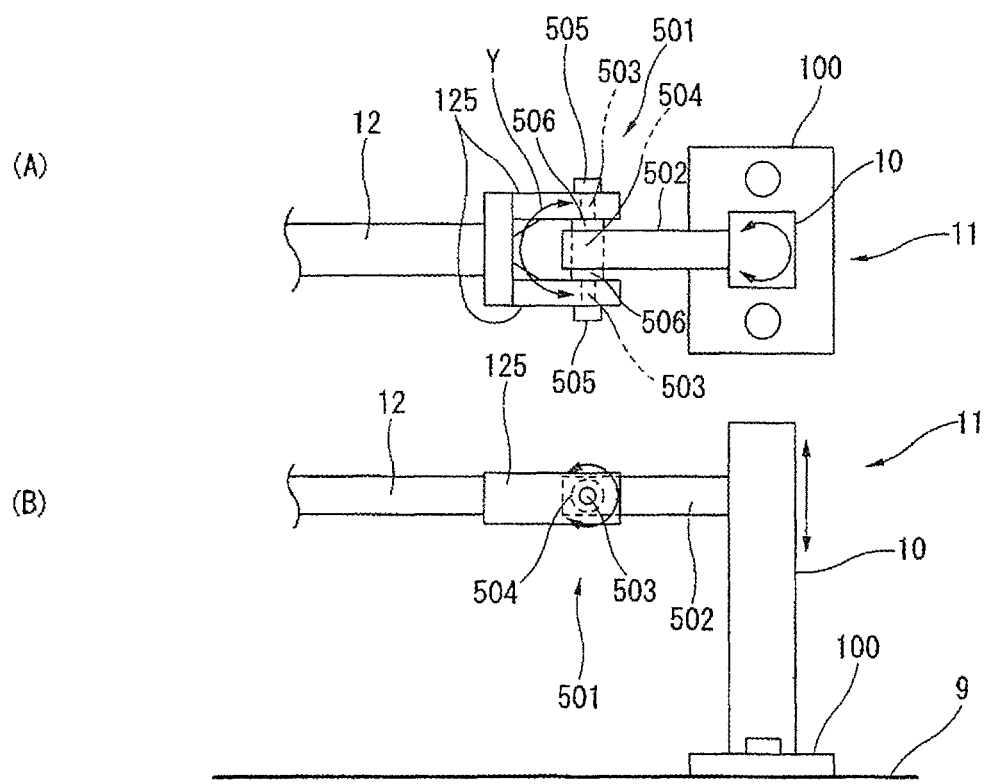
FIG. 33(A) is a schematic plan view of a second link mechanism in the thirteenth embodiment.
FIG. 33(B) is a schematic side view of the same mechanism.

The vehicle restraint device 11 of the present embodiment shown in FIG. 33 is equipped with the following second link mechanism (coupling mechanism), in place of the second link mechanism 17 in any mode of the first to twelfth embodiments.

The second link mechanism 501 links the other end side of the vehicle restraint jig 12 to the pole 10 in a manner to make yawing movement (movement in horizontal direction shown by arrow Y of FIG. 33) of this vehicle restraint jig 12 possible.

The second link mechanism 501 is equipped with a shaft portion 503 that passes through the bracket portion 502 possessed by the pole 10 and that is supported by a pair of bracket portions 125 possessed by the other end side of the vehicle restraint jig 12, and a pillow ball (spherical sliding bearing) 504 that is mounted on this shaft portion 503 and is fitted into the bracket portion 502.

Furthermore, fasteners 505 such as nuts are mounted on both ends of the shaft portion 503 in order to prevent detachment of the shaft portion 503 from the bracket portion 125.

According to the vehicle restraint device 11 equipped with the second link mechanism 501 above, the following advantageous effect is achieved in addition to the advantageous effects of the first to twelfth embodiments.

Without a strict adjustment of the arrangement of the base portion 100 of the pole 10 on the floor surface 9, it is possible to freely set the setting angle of the vehicle restraint jig 12 relative to the bracket portion 502 of the pole 10 by the pillow ball 504. With this, it becomes possible to shorten the operation time for attaching the vehicle restraint device 11.

By the way, in a conventional vehicle restraint device disclosed in Patent Publication 10, it is possible to rotatably move a movable metal member in a vertical direction of a pole and about the pole as the axis by providing a slide bearing having the movable metal member equipped with a hook, to which a chain for restraining a vehicle is connected, at an arbitrary position of the pole.

In the conventional vehicle restraint device, however, once the movable metal member has been fixed to the pole, it is not possible to conduct a fine adjustment of the position of the pole. Furthermore, there is a problem that yawing movement of the vehicle is restrained.

In particular, after connecting the vehicle to the poles, the movable range of the vehicle is fixed or limited in order to secure protection coordination such as over-rotation of the pole. That is, yawing movement of the vehicle is considerably restrained. Furthermore, in a running condition after restraining the vehicle, it is necessary to consider yawing of the vehicle, too. Thus, in the case of allowing a certain angle at a connection section between the chain and the pole, there is a possibility that mechanical play such as gap increases.

In contrast with this, in the vehicle restraint device 11 of the present embodiment, the pillow ball 504 mounted on the shaft portion 503 supported in the bracket portion 125 on the side of the vehicle restraint jig 12 is fitted into the bracket portion 502 on the side of the pole 10, thereby minimizing the gap between the shaft portion 503 and the bracket portion 502. Therefore, it is possible to surely and strongly connect the vehicle 1 and the pole 10 on the floor surface 9, and it is possible to limit the movement of the vehicle 1 in the back-and-forth direction.

Due to expanding rotation of the vehicle 1 in the vehicle width direction with the pillow ball 504 in addition to protection coordination of the pole 10 on the floor surface 9, it becomes possible to allow yawing movement of the vehicle 1 in the movable range of the pillow ball 504.

Furthermore, it is beneficial to mount pillow collars (intermediate members) 506 each at a position of the shaft 503 between the bracket portion 502 of the pole 10 and the bracket portion 125 of the vehicle restraint jig 12. Since a mechanical play between the bracket portions 502, 125 is further eliminated, it is possible to still further surely and strongly connect the vehicle 10 and the pole 10.

As above, according to the vehicle restraint device 11 of the present embodiment, it is possible to still further effectively reproduce the vehicle behavior analogous to that on a road, which is intended by the tester.

Furthermore, it is optional to adopt the following second link mechanism (coupling mechanism) 501, in place of the above second link mechanism 501.

The second link mechanism 501 is equipped with a shaft portion 503 that passes through a bracket 126, which is provided on the other end side of the vehicle restraint jig 12 to be coaxial with this jig 12, and that is supported by a pair of bracket portions 507 provided at the pole 10, and a pillow ball 504 that is mounted on the shaft portion 503 and is fitted into the bracket portion 126 of the vehicle restraint jig 12. By such mode, this vehicle restraint jig 12 is connected to the pole 10 in a manner to make yawing movement (movement in horizontal direction shown by arrow Y of FIG. 34) of this vehicle restraint jig 12 possible.

The above pair of bracket portions 507 is fixed to one end of the bracket portion 502 provided at the pole 10. In order to prevent detachment of the shaft portion 503 from the bracket portions 507, fasteners 505 are mounted on both ends of the shaft portion 503.

According to the vehicle restraint device 11 equipped with the second link mechanism 501 above, it is clear to obtain advantageous effects that are substantially equivalent to those of the vehicle restraint device 11 equipped with the second link mechanism 501 of FIG. 33.

Even in the second link mechanism 501, it is beneficial to mount pillow collars (intermediate members) 506 each at a position of the shaft 503 between the bracket portion 502 of the pole 10 and the bracket portion 126 of the vehicle restraint jig 12. According to the present mode, a mechanical play between the bracket portions 502, 126 is further eliminated. Therefore, it is possible to still further surely and strongly connect the vehicle 10 and the pole 10.

Fourteenth Embodiment

Figure 35:
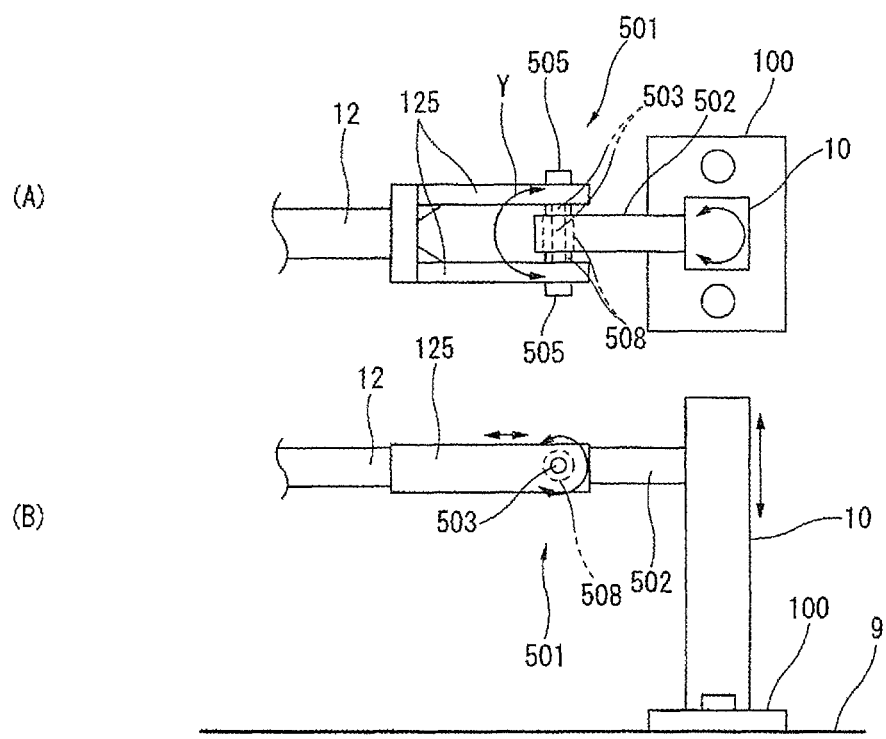
FIG. 35(A) is a schematic plan view of a second link mechanism in the fourteenth embodiment.
FIG. 35(B) is a schematic side view of the same mechanism.

Furthermore, it is optional to adopt a second link mechanism (coupling mechanism) 501 shown in FIG. 35, in place of the second link mechanism 501 of the thirteenth embodiment.

The second link mechanism 501 of the present embodiment is substantially the same as the second link mechanism 501 of FIG. 33, except that it is equipped with a bearing 508 in place of the pillow ball 504.

That is, the second link mechanism 501 is equipped with a shaft portion 503 that passes through a bracket 502 provided at a pole 10 and that is supported by a pair of bracket portions 125 provided at the other end side of the vehicle restraint jig 12, and a bearing 508 that is mounted on this shaft portion 503 and that is fitted into the bracket portion 502.

The bearing 508 is equipped with an elastic member. That is, as shown in FIG. 35, the bearing 508 is equipped with an inner bearing portion 581 that is mounted on the shaft portion 503, an outer bearing portion 582 that is fitted into the bracket portion 502, and an elastic member 583 that is interposed between the inner bearing portion 581 and the outer bearing portion 582. The elastic member 583 as a buffering material is formed, for example, of an elastic synthetic rubber.

By the mode of such second link mechanism 501, this vehicle restraint jig 12 is connected to the pole 10 in a manner to make yawing movement (movement in horizontal direction shown by arrow Y of FIG. 35) of this vehicle restraint jig 12 possible.

It is clear that advantageous effects similar to those of the thirteenth embodiment can be obtained by the vehicle restraint device 11 equipped with the second link mechanism 501 above, too.

That is, without a strict adjustment of the arrangement of the base portion 100 of the pole 10 on the floor surface 9, it is possible to freely set the installation angle of the vehicle restraint jig 12 relative to the bracket portion 502 of the pole 10 by the bearing 508 equipped with the elastic member 583. With this, it becomes possible to shorten the operation time for attaching the vehicle restraint device 11.

The bearing 508 mounted on the shaft portion 503 supported by the bracket portions 125 on the side of the vehicle restraint jig 12 is fitted into the bracket portion 502 on the side of the pole 10. Therefore, it allows a very small movement in the back-and-forth direction of the vehicle 1 by the buffer material characteristic of the elastic member 583 of the bearing 508. Furthermore, it is possible to obtain a relatively large torsion angle in the vehicle restraint jig 12. Therefore, when the vehicle restraint jig 12 and the pole 10 are connected, a stress load against the vehicle restraint jig 12 and the pole 10 is reduced. Then, in addition to protection coordination of the pole 10 on the floor surface 9, the rotation in the vehicle width direction is extended by the elastic member 583, and it becomes possible to allow yawing movement of the vehicle 1 in the buffer material characteristic of the elastic member 583.

As above, according to the vehicle restraint device 11 of the present embodiment, it is possible to still more effectively reproduce the vehicle behavior analogous to that on a road, which is intended by the tester.

Figure 36:
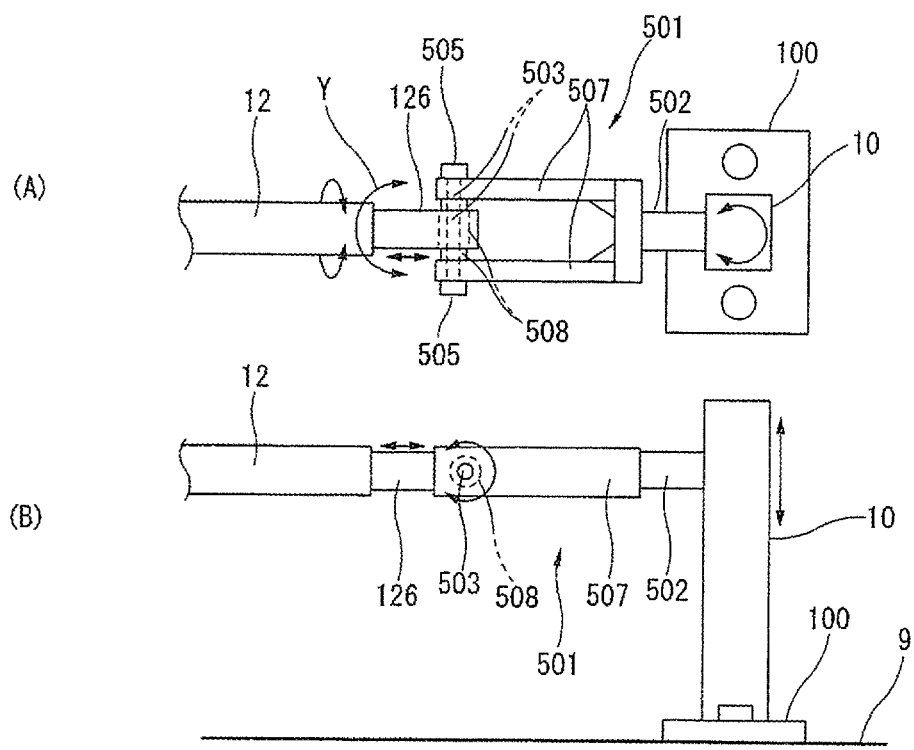
FIG. 36(A) is a schematic plan view showing another mode of the second link mechanism in the fourteenth embodiment.
FIG. 36(B) is a schematic side view of the same mode.
Figure 37:
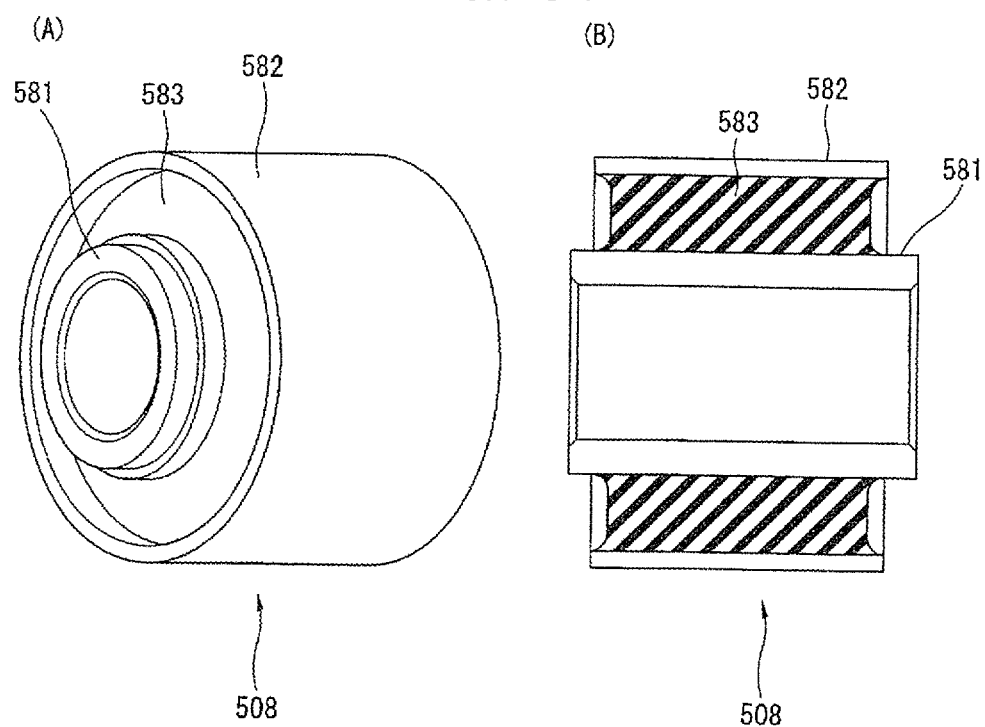
FIG. 37(A) is a perspective view of a bearing in the fourteenth embodiment.
FIG. 37(B) is a sectional view of the same bearing.

Furthermore, in place of the above second link mechanism 501, it is optional to adopt a second link mechanism (coupling mechanism) 501 shown in FIG. 36. The second link mechanism 501 of the present mode has substantially the same mode as that of the second link mechanism 501 of FIG. 34, except being equipped with a bearing 508 in place of the pillow ball 504.

That is, the second link mechanism 501 of FIG. 36 is equipped with a shaft portion 503 that passes through a bracket portion 126, which is provided at the other end side of the vehicle restraint jig 12 to be coaxial with this jig 12, and that is supported by a pair of bracket portions 507 provided at the pole, and with a bearing 508 that is mounted on this shaft portion 503 and that is fitted into the bracket portion 126 of the vehicle restraint jig 12. By such mode, this vehicle restraint jig 12 is connected to the pole 10 in a manner to make its yawing movement (movement in horizontal direction shown by arrow Y of FIG. 36) possible.

Figure 34:
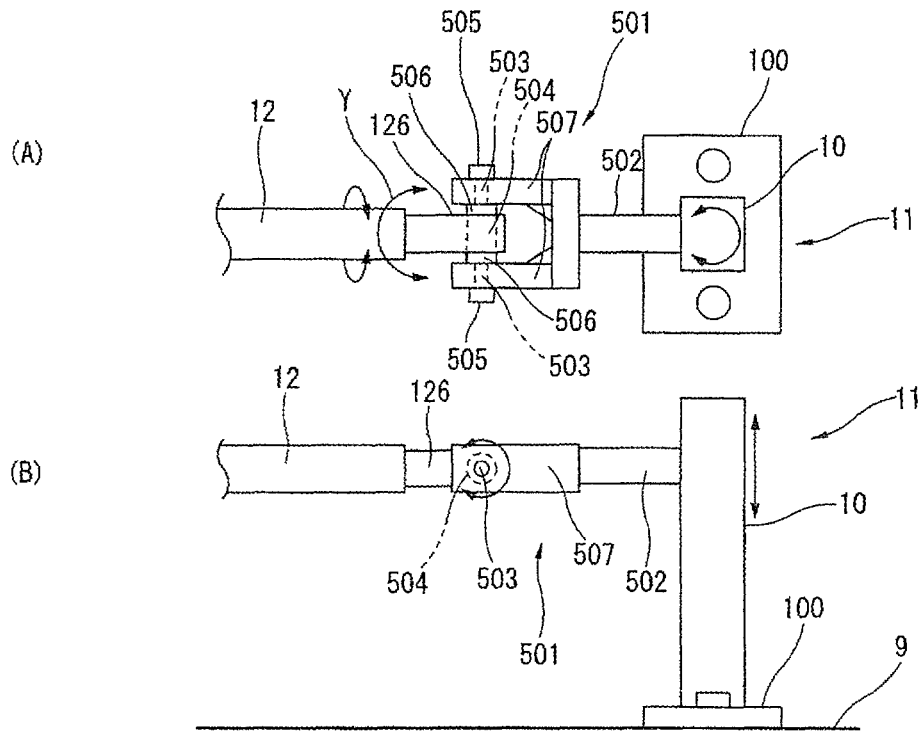
FIG. 34(A) is a schematic plan view showing another mode of the second link mechanism in the thirteenth embodiment.
FIG. 34(B) is a schematic side view of the same mode.

According to the vehicle restraint device 11 equipped with the second link mechanism 501 above, it is clear that advantageous effects substantially equivalent to those of the vehicle restraint device 11 equipped with the second link mechanism of FIG. 34 can be obtained.

Figure 38:
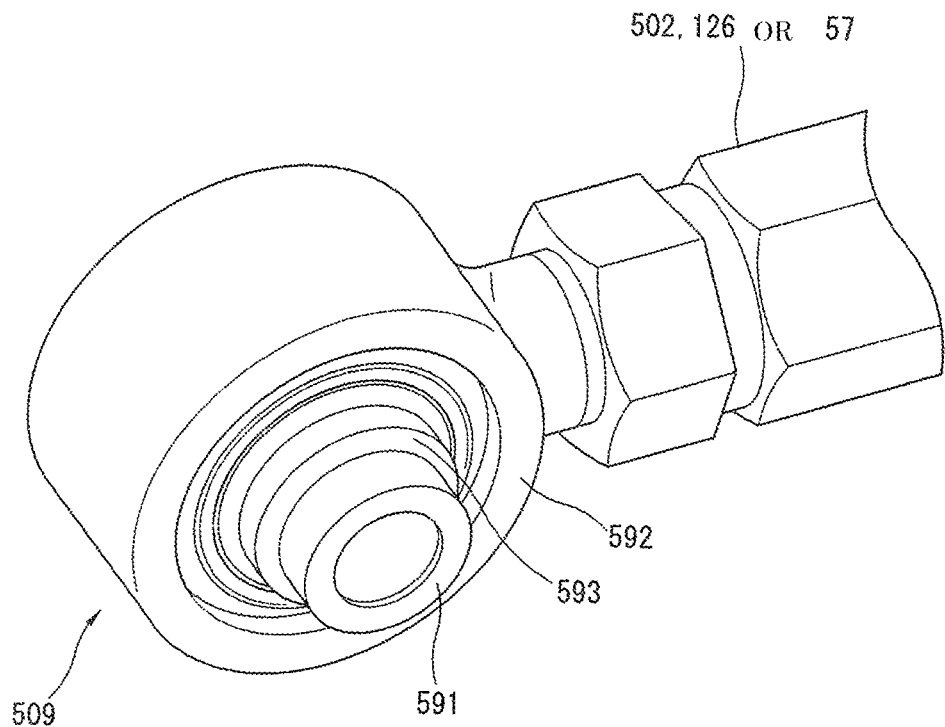
FIG. 38 is a perspective view showing another mode of a spherical slide bearing in the fourteenth embodiment.
Figure 39:
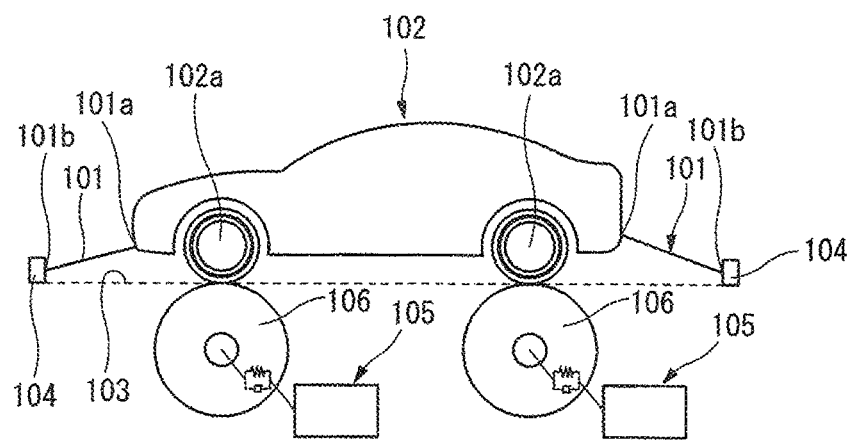
FIG. 39 is an explanatory view of a conventional example.
Figure 40:
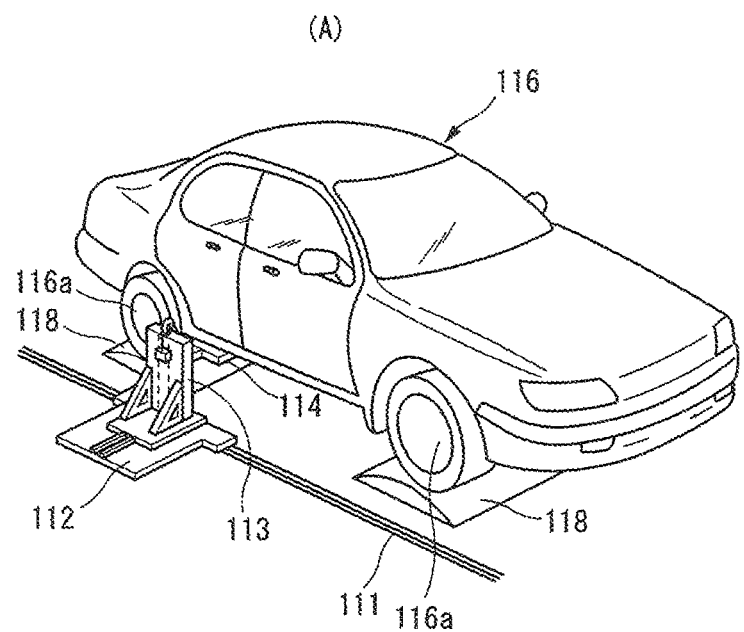
FIG. 40(A) is a perspective view showing another conventional example.
FIG. 40(B) is a sectional view of an adaptor and an adaptor inserting portion of the vehicle restraint device.
Figure 40:
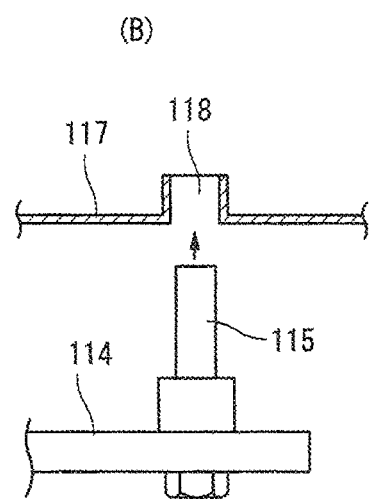

The bracket portion 502 of FIG. 33 or the bracket portion 126 of FIG. 34 is equipped with a pillow ball (spherical slide bearing) 509 equipped with an elastic member 593 exemplified by a pillow ball bush shown in FIG. 38, in place of the pillow ball 504.

The pillow ball 509 is equipped with an inner sleeve portion 591 that is mounted on the shaft portion 503 and has a spherical outer peripheral surface, an outer sleeve portion 592 that is connected to one end of the bracket portion 502, 126, and an elastic member 593 that is interposed between the inner sleeve portion 591 and the outer sleeve portion 592 and that is made of an elastic synthetic rubber.

According to the second link mechanism to which this pillow ball 509 has been applied, it is possible to obtain a relatively large torsion angle in the vehicle restraint jigs 12 of FIG. 33 and FIG. 34. Therefore, in addition to the advantageous effects of the thirteenth embodiment (modes of FIG. 33 and FIG. 34), when the vehicle restraint jig 12 and the pole 10 are connected, a stress load against the vehicle restraint jig 12 and the pole 10 is reduced.

Furthermore, it is beneficial that the connecting jig 53, which is connected to around both ends of the reinforcing jig 52 and the first reinforcing jig 86 or either one of the reinforcing jig 52 and the first reinforcing jig 86 of FIG. 25, is equipped with the pillow ball 509 of FIG. 38.

Furthermore, it is beneficial that the connecting jig 53 connected to around both ends of the reinforcing jig 52 of FIGS. 10-14, 20 and 23 or the connecting jig 53 connected to the connecting shaft 73 of FIGS. 15, 17, 19 and 21 is equipped with the pillow ball 509 of FIG. 38. Then, the vehicle restraint device 11 may be equipped with a combination of this connecting jig 53 and either one of the second link mechanism 501 of FIGS. 33-36 and the bracket portion 502, 126 having the above-mentioned pillow ball 59.

The pillow ball 509 is mounted on around both ends of the above-mentioned reinforcing jig 52 and/or the first reinforcing jig 86 or on the above-mentioned connecting shaft 73. That is, the pillow ball 509 is equipped with an inner sleeve portion 591 that is mounted on around both ends of the reinforcing jig 52 and/or the first reinforcing jig 86 or on the connecting shaft 73 and that has a spherical outer peripheral surface, an outer sleeve portion 592 that is connected to the connecting jig 57 of the connecting jig 53 to which one end of the vehicle restraint jig 12 or one end or the other end of the vehicle restraint jig 82 is connected, and an elastic member 593 that is interposed between the inner sleeve portion 591 and the outer sleeve portion 592 and is made of an elastic synthetic rubber.

According to the mode equipped with the pillow ball 509 above, it is possible to obtain a further relatively large torsion angle in the vehicle restraint jig 12, 82. Therefore, in addition to advantageous effects of the first to fourteenth embodiments, when connecting the vehicle restraint jig 12, 82 and the reinforcing jig 52, the first reinforcing jig 86 and the connecting shaft 73, a stress load against the vehicle restraint jig 12, 82, the reinforcing jig 52, the first reinforcing jig 86 and the connecting shaft 73 is reduced.

The invention claimed is:

1. A vehicle test and restraint system, comprising:
    a vehicle test device comprising rollers;
    a vehicle placed on the rollers, the vehicle including left and right seatbelt fixing pillars located at left and right door sides of the vehicle, respectively; and
    a vehicle restraint device comprising:
        a pair of vehicle restraint jigs having one end sides that are respectively rotatably connected to the left and right seatbelt fixing pillars of the vehicle and another end sides that are rotatably connected to left and right poles on a floor surface; and
        a connecting mechanism that connects the another end sides of the vehicle restraint jigs to the poles to allow a yawing movement of the vehicle restraint jigs.

2. The vehicle test and restraint system as claimed in claim 1, further comprising:
    a pair of pillar attachment members that are attached to the left and right seatbelt fixing pillars;
    a reinforcing jig that connects and reinforces the pair of pillar attachment members and is adjustable in length;
    a connecting jig that connects the one end sides of the vehicle restraint jigs to around both ends of the reinforcing jig; and
    spherical slide bearings that are provided at the connecting jig and are mounted on around both ends of the reinforcing jig.

3. The vehicle test and restraint system device as claimed in claim 1, further comprising:
    a connecting shaft that is attached to the left and right seatbelt fixing pillars of the vehicle;
    a connecting jig that connects the one end sides of the vehicle restraint jigs to the connecting shaft; and
    a spherical slide bearing that is provided at the connecting jig and is mounted on the connecting shaft.

4. The vehicle test and restraint system as claimed in claim 1, further comprising a lateral deviation suppressing mechanism that suppresses a lateral deviation of the vehicle, which occurs at testing the vehicle by the vehicle test device.

5. The vehicle test and restraint system as claimed in claim 4, wherein the lateral deviation suppressing mechanism comprises:

a buffering material that is brought into an elastic abutment with a body of the vehicle;

a supporting member that supports the buffering material to be adjustable in a width direction of the vehicle; and a support portion to which the supporting member is attached.

6. The vehicle test and restraint system as claimed in claim 1, further comprising a deflection absorbing mechanism that absorbs deflection of the associated vehicle restraint jig, which occurs at testing the vehicle by the vehicle test device.

7. The vehicle test and restraint system as claimed in claim 1, further comprising a vibration damping device that is detachably attached to the associated vehicle restraint jig and damps vibration of the associated vehicle restraint jig, which occurs at testing of the vehicle by the vehicle restraint device.

8. A vehicle restraint device for restraining a vehicle placed on rollers of a vehicle testing device, comprising:

a pair of vehicle restraint jigs having one end sides that are rotatably connected to the vehicle and another end sides that are rotatably connected to left and right poles on a floor surface; and a connecting mechanism that connects the another end sides of the vehicle restraint jigs to the poles to allow a yawing movement of the vehicle restraint jigs, wherein the connecting mechanism comprises a first connecting mechanism or a second connecting mechanism;

wherein the first connecting mechanism comprises:

a first shaft portion that passes through a first bracket provided at one of the left and right poles and is supported by a first pair of bracket portions provided at the another end side of the associated vehicle restraint jig; and a first spherical slide bearing that is mounted on the first shaft portion and is fitted into the first bracket of the associated pole, wherein the second connecting mechanism comprises:

a second shaft portion that passes through a second bracket provided at the another end side of the associated vehicle restraint jig and is supported by a second pair of bracket portions provided at one of the left and right poles; and a second spherical slide bearing that is mounted on the second shaft portion and is fitted into the second bracket of the associated vehicle restraint jig.

9. The vehicle restraint device as claimed in claim 8, wherein an intermediate member is mounted at a position of each of the first and second shaft portions between the associated bracket and the associated pair of bracket portions.

10. The vehicle restraint device as claimed in claim 8, further comprising:

a pair of pillar attachment members that are attached to left and right seatbelt fixing pillars;

a reinforcing jig that connects and reinforces the pair of pillar attachment members and is adjustable in length;

a connecting jig that connects the one end sides of the vehicle restraint jigs to around both ends of the reinforcing jig; and spherical slide bearings that are provided at the connecting jig and are mounted on around both ends of the reinforcing jig.

11. The vehicle restraint device as claimed in claim 8, further comprising:

a connecting shaft that is attached to left and right seatbelt fixing pillars of the vehicle;

a connecting jig that connects the one end side of the associated vehicle restraint jig to the connecting shaft; and a spherical slide bearing that is provided at the connecting jig and is mounted on the connecting shaft.

12. The vehicle restraint device as claimed in claim 8, wherein each spherical slide bearing comprises an elastic member.

13. The vehicle restraint device as claimed in claim 8, further comprising a lateral deviation suppressing mechanism that suppresses a lateral deviation of the vehicle, which occurs at testing the vehicle by the vehicle testing device.

14. The vehicle restraint device as claimed in claim 8, further comprising a deflection absorbing mechanism that absorbs deflection of the associated vehicle restraint jig, which occurs at testing the vehicle by the vehicle testing device.

15. The vehicle restraint device as claimed in claim 8, further comprising a vibration damping device that is detachably attached to the associated vehicle restraint jig and damps vibration of the associated vehicle restraint jig, which occurs at testing of the vehicle by the vehicle restraint device.

16. The vehicle restraint device as claimed in claim 8, wherein each of the first and second spherical slide bearings comprises:

an inner sleeve portion that is mounted on the associated shaft portion and has a spherical outer peripheral surface;

an outer sleeve portion that is connected to one end of the associated bracket or bracket portions; and an elastic member that is interposed between the inner sleeve portion and the outer sleeve portion.

17. A vehicle restraint device for restraining a vehicle placed on rollers of a vehicle testing device, comprising:

a pair of vehicle restraint jigs, each having a first end side rotatably connected to the vehicle and a second end side rotatably connected to one pole of left and right poles on a floor surface; and a connecting mechanism that connects the second end side of each vehicle restraint jig to the associated pole to allow a yawing movement of the vehicle restraint jigs, wherein the connecting mechanism comprises a first connecting mechanism or a second connecting mechanism, wherein the first connecting mechanism comprises:

a first shaft portion that passes through a first bracket provided at the associated pole and is supported by a first pair of bracket portions provided at the second end side of the associated vehicle restraint jig; and a first bearing that is mounted on the first shaft portion, is fitted into the first bracket of the pole, and has a first elastic member, wherein the second connecting mechanism comprises:

a second shaft portion that passes through a second bracket provided at the second end side of the associated vehicle restraint jig and is supported by a second pair of bracket portions provided at the associated pole; and a second bearing that is mounted on the second shaft portion, is fitted into the second bracket of the associated vehicle restraint jig, and has a second elastic member.

18. The vehicle restraint device as claimed in claim 17, further comprising:
- a pair of pillar attachment members that are attached to left and right seatbelt fixing pillars;
- a reinforcing jig that connects and reinforces the pair of pillar attachment members and is adjustable in length;
- a connecting jig that connects the first end sides of the vehicle restraint jigs to around both ends of the reinforcing jig; and
- spherical slide bearings that are provided at the connecting jig and are mounted on around both ends of the reinforcing jig.

19. The vehicle restraint device as claimed in claim 17, further comprising:
- a connecting shaft that is attached to left and right seatbelt fixing pillars of the vehicle;
- a connecting jig that connects the first end side of the each vehicle restraint jig to the associated connecting shaft; and
- a spherical slide bearing that is provided at the connecting jig and is mounted on the connecting shaft.

20. The vehicle restraint device as claimed in claim 17, further comprising a lateral deviation suppressing mechanism that suppresses a lateral deviation of the vehicle, which occurs at testing the vehicle by the vehicle testing device.

21. The vehicle restraint device as claimed in claim 17, further comprising a deflection absorbing mechanism that absorbs deflection of the associated vehicle restraint jig, which occurs at testing the vehicle by the vehicle testing device.

22. The vehicle restraint device as claimed in claim 17, further comprising a vibration damping device that is detachably attached to the associated vehicle restraint jig and damps vibration of the associated vehicle restraint jig, which occurs at testing of the vehicle by the vehicle restraint device.

* * * * *